United States Patent [19]

Fukui et al.

[11] Patent Number: 5,933,261

[45] Date of Patent: Aug. 3, 1999

[54] INFORMATION PROCESSING METHOD AND SYSTEM

[75] Inventors: Toshiyuki Fukui, Kawasaki; Kazumasa Hamaguchi, Yokohama; Tomohiko Shimoyama, Yokohama; Shuichi Nakamura, Yokohama, all of Japan

[73] Assignee: Canon Kabushiki Kaisha, Tokyo, Japan

[21] Appl. No.: 08/672,022

[22] Filed: Jun. 26, 1996

[30] Foreign Application Priority Data

Jun. 26, 1995 [JP] Japan ................................. 7-159252
Oct. 26, 1995 [JP] Japan ................................. 7-278911

[51] Int. Cl.⁶ ................................................ H04J 14/02
[52] U.S. Cl. ......................... 359/125; 359/110; 359/158
[58] Field of Search ................................. 359/114, 118, 359/120, 121, 124, 125, 110, 158, 164; 340/825.06, 825.51; 370/348, 350

[56] References Cited

U.S. PATENT DOCUMENTS

| 5,185,736 | 2/1993 | Tyrrell et al. ........................... 370/55 |
| 5,289,303 | 2/1994 | Cloonan et al. ....................... 359/139 |
| 5,561,542 | 10/1996 | Kosugi et al. ......................... 359/118 |

FOREIGN PATENT DOCUMENTS 7-143136  6/1995  Japan .

OTHER PUBLICATIONS

*PowerPC601 RISC Microprocessor User's Manual* (MPC601UM/AD Rev 1), secs. 3.5.7, 8.2.9.8, and 9.8.1.

*Primary Examiner*—Rafael Bacares
*Attorney, Agent, or Firm*—Fitzpatrick, Cella, Harper & Scinto

[57] ABSTRACT

An information processing system has a plurality of nodes each including one or more CPUs that utilize monitoring of a common bus, wherein the plurality of nodes are connected to one another by a connection path that cannot monitor information on an internal bus in each node. Information required to perform synchronized operation in a node or among nodes is transmitted to an arbiter via an optical fiber serving as a transmission path different from the connection path, and part of this information is again distributed from the arbiter to each of the nodes based upon the information. The system operates in such a manner that the information is reflected in its own node based upon the re-distributed information. Further, in order to perform the synchronized operation among CPUs based upon the re-distributed information, the system controls the information to be distributed from each node to arbiter. Thus, when an operation for maintaining synchronization among CPUs is performed, the present invention enables the system to reduce processing which accompanies synchronizing operation by CPUs across nodes and improve the processing capability of the entire system.

17 Claims, 34 Drawing Sheets

INFORMATION PROCESSING METHOD AND SYSTEM

BACKGROUND OF THE INVENTION

This invention relates to an information processing method and system in which a plurality of nodes operate synchronously by referring to flags.

The following two synchronizing mechanisms have been proposed to achieve synchronization among CPUs in a multiprocessor system:

(1) A synchronizing mechanism realized by allowing an individual CPU to occupy, at a certain instant in time, a common bus to which a plurality of CPUs are connected.

(2) A mechanism in which synchronization among the CPUs is achieved by using reserve flags.

The mechanism in (2) above has an instruction (referred to as a "load reserve", or "LR", instruction) for setting a reserve flag attendant upon a loading instruction for performing data readout, an instruction (referred to as a "store conditional", or "SC", instruction), which is one type of conditional store instruction, for checking the reserve flag prior to execution of a storing instruction, executing the storing instruction if the reserve flag is valid and then making the reserve flag invalid, and a function (referred to as a "store snoop", or "SS", function) with which the bus is monitored for making the reserve flag invalid if it is detected that another CPU has executed the storing instruction at an address identical with an address at which the LR instruction has been executed. The synchronizing mechanism is realized by using LR, SC and SS. Mechanism (2) aims at making the performance of a multiple-CPU system better than in mechanism (1) by not utilizing occupation of the bus.

However, when arbiters and nodes are connected via a connection path where information on the bus in each node cannot be snooped without being controlled by CPU, in a system of the type proposed in the above-mentioned CPU synchronizing techniques in which only address and control information accompanying a store instruction executed at each node is adopted as information necessary to implement synchronized operation, it is required that the synchronizing information always be sent to all nodes whenever the synchronizing information is received. Information is exchanged between nodes even in cases where CPUs are not being synchronized. As a consequence, there is unnecessary processing and traffic at arbiters and nodes, resulting in a decline in performance.

SUMMARY OF THE INVENTION

The present invention has been devised in view of the foregoing problems and its object is to provide an information processing system and method for improving the processing capability of the entire system in an operation for maintaining synchronization among CPUs, this being achieved by reducing processing which accompanies synchronized operation by CPUs across nodes and reducing the load involved in implementing synchronized operation.

According to the present invention, the foregoing object is attained by providing an information processing system having a plurality of nodes each including one or more CPUs that utilize monitoring of a common bus, wherein the plurality of nodes are connected to one another by a connection path that cannot monitor information on an internal bus in each node, the information processing system comprising arbitration means for arbitrating use of the connection path, transmission paths for mutually connecting the arbitration means and the plurality of nodes to one another, the transmission paths being different from the connection path, transmission means for transmitting information, which is required to perform synchronized operation in a node or among the nodes, to the arbitration means via the transmission paths, distribution means for again distributing a portion of this information from the arbitration means to each node based upon the information transmitted by the transmission means, and reflecting means for reflecting, to each node, information distributed by the distribution means to each node.

According to the present invention, the foregoing object is attained by providing an information processing method in an information processing system having a plurality of nodes each including one or more CPUs that utilize monitoring of a common bus, wherein the plurality of nodes are connected to one another by a connection path that cannot monitor information on an internal bus in each node, and the information processing system includes arbitration means for arbitrating use of the connection path, transmission paths for mutually connecting the arbitration means and the plurality of nodes to one another, the transmission paths being different from the connection path, transmission means for transmitting information, which is required to perform synchronized operation in a node or among nodes, to the arbitration means via the transmission paths, and distribution means for again distributing a portion of this information from the arbitration means to each node based upon the information transmitted by the transmission means, the information distributed to each node by the distribution means being reflected to each node, the method comprising the steps of using a load reserve instruction for setting a reserve flag attendant upon execution of a loading instruction, and a store conditional instruction for checking the reserve flag prior to execution of a storing instruction, executing the storing instruction if the reserve flag is valid and then invalidating the reserve flag, and making possible synchronized operation among the CPUs by having a function with which the bus is monitored for making the reserve flag invalid if it is detected that another CPU has executed the storing instruction at an address identical with an address at which the load reserve instruction has been executed.

Another object of the present invention is to provide an information processing system and method in which, when CPUs are synchronized by executing CPU synchronization across nodes, it is possible to prevent an increase in traffic on transmission lines.

According to the present invention, the foregoing object is attained by providing an information processing system having a plurality of nodes each including one or more CPUs that utilize monitoring of a common bus, wherein the plurality of nodes are connected to one another by a connection path that cannot monitor information on an internal bus in each node, the information processing system comprising arbitration means for arbitrating use of the connection path, transmission paths for mutually connecting the arbitration means and the plurality of nodes to one another, the transmission paths being different from the connection path, transmission means for transmitting information, which is required to perform synchronized operation in a node or among the nodes, to the arbitration means via the transmission paths, distribution means for again distributing a portion of this information from the arbitration means to each node based upon the information transmitted by the transmission means, reflecting means for reflecting, to each node, information distributed by the distribution means to each node, and control means controls sending of information, which accompanies synchronized operation performed at each node, to the arbitration means based upon the information, transmitted as information required to perform the synchronized operation, indicating whether each node is currently performing synchronized operation, According to the present invention, the foregoing object is attained by providing an information processing method in an information processing system having a plurality of nodes each including one or more CPUs that utilize monitoring of a common bus, wherein the plurality of nodes are connected to one another by a connection path that cannot monitor information on an internal bus in each node, and the information processing system includes arbitration means for arbitrating use of the connection path, transmission paths for mutually connecting the arbitration means and the plurality of nodes to one another, the transmission paths being different from the connection path, transmission means for transmitting information, which is required to perform synchronized operation in a node or among nodes, to the arbitration means via the transmission paths, and distribution means for again distributing a portion of this information from the arbitration means to each node based upon the information transmitted by the transmission means, the information distributed to each node by the distribution means being reflected to each node, the method comprising a notification step of notifying each node, in advance, of information indicating whether each node is operating synchronously, this information being contained in the information transmitted as information required to perform the synchronized operation, and a control step of controlling sending of information, which accompanies synchronized operation performed at each node, to the arbitration means.

By virtue of the foregoing arrangement, the present invention is capable of providing an information processing system and method for improving the processing capability of the entire system in an operation for maintaining synchronization among CPUs, this being achieved by reducing processing which accompanies synchronized operation by CPUs across nodes and reducing the load involved in implementing synchronized operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail with reference to the accompanying drawings.

Figure 1:
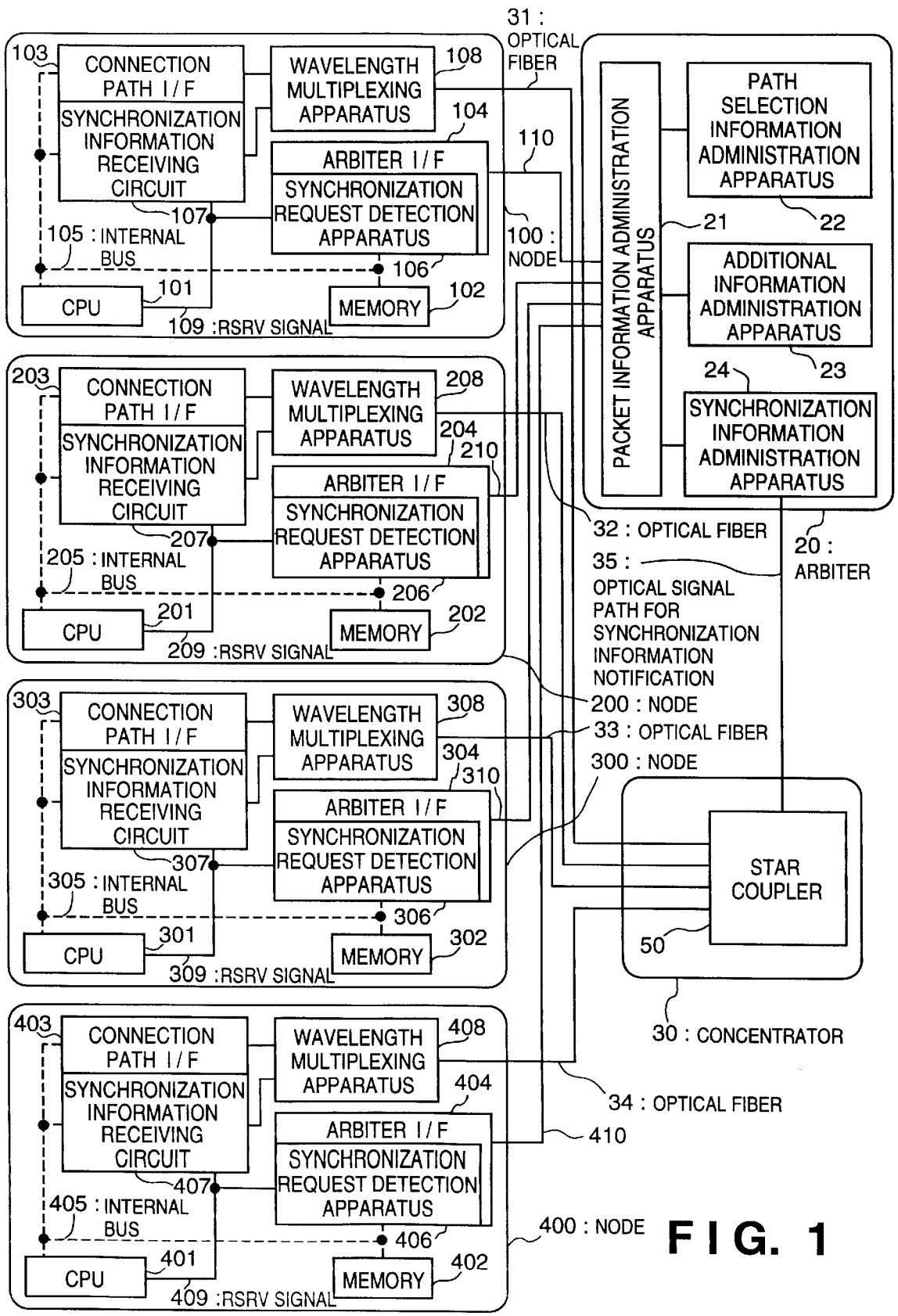
FIG. 1 is a block diagram showing the architecture of an embodiment of an information processing system according to the present invention.

FIG. 1 is a block diagram showing the architecture of an embodiment of an information processing system according to the present invention.

As shown in FIG. 1, nodes 100, 200, 300 and 400 are connected to a concentrator 30 by a connection path composed of pairs of optical fibers 31, 32, 33 and 34 for transferring data in two directions. The concentrator 30 incorporates a star coupler 50 for again distributing signals obtained from the connection path composed of the optical fibers 31, 32, 33 and 34.

The nodes 100, 200, 300 and 400 are internally provided with CPUs 101, 201, 301 and 401 and with memories 102, 202, 302 and 402, respectively. Further, connection path interface circuits (connection path I/Fs) 103, 203, 303 and 403 in respective ones of the nodes connect the connection path composed of the optical fibers 31, 32, 33 and 34 with the interiors of the respective nodes. Arbitration interfaces (arbiter I/Fs) 104, 204, 304 and 404 in respective nodes request utilization of the connection path composed of the optical fibers 31, 32, 33 and 34.

Furthermore, the respective nodes include synchronization information receiving circuits 107, 207, 307 and 407, internal buses 105, 205, 305 and 405 for connecting the above-mentioned components to one another inside each of the nodes, and wavelength multiplexing apparatus 108, 208, 308 and 408. The functions of these components will clarified in the description below.

The arbiter I/Fs 104, 204, 304 and 404 include synchronization request detection apparatus 106, 206, 306 and 406, respectively, for detecting synchronization-related instructions on the internal buses 105, 205, 305 and 405, respectively, and informing an arbiter 20 of the synchronization-related instructions. The CPUs 101, 201, 301 and 401 output RSRV signals [which are driven to the "H" level when an internal reserve flag is valid ("1")] 109, 209, 309 and 409, respectively, which reflect the state of the internal reserve flag. The RSRV signals 109, 209, 309, 409 enter the synchronization demand detection apparatus 106, 206, 306, 406 and synchronization information receiving circuits 107, 207, 307, 407, respectively. It should be noted that the present invention is not limited by this architecture. For example, each node may be internally provided with a plurality of CPUs and may have a cache memory.

The arbiter 20 arbitrates use of the connection path composed of the optical fibers 31, 32, 33, 34. The arbiter 20 is connected to the nodes 100~400 by respective ones of arbitration signal lines (optical fibers 110, 210, 310, 410).

The arbiter 20 incorporates a packet information administration apparatus 21 for administering packets sent from each node, a path selection information administration apparatus 22 for administering path request information included in information contained in a packet, an additional information administration apparatus 23 for temporarily storing additional information which accompanies transfer of data such as an address sent following the above-mentioned information, and a synchronization information administration apparatus 24 which performs control for again distributing protocol information to each node, as well as temporarily stores necessary information to realize CPU synchronizing mechanism in a packet. The synchronization information administration apparatus 24 is connected to the star coupler 50 inside the concentrator 30 by an optical signal path 35 for giving notification of synchronization information.

In the first embodiment, the arbiter 20 is notified of the states of the RSRV signal lines 109, 209, 309, 409 in the system having the architecture shown in FIG. 1, the synchronization information is centrally administered through the arbiter 20, and the synchronization information is broadcast from the arbiter 20 to each of the nodes as necessary based upon the states of the RSRV signal lines. As a result, it is possible to realize a CPU synchronizing mechanism across nodes under a condition in which buses cannot monitor one another.

A concrete example of operation will be described below for a case where the CPU 101 of node 100, the CPU 201 of node 200 and the CPU 301 of node 300 attempt to operate synchronously with respect to data in the memory 202 of node 200. Specifically, how the synchronized operation is maintained among the CPUs in this case will be described.

Figure 2:
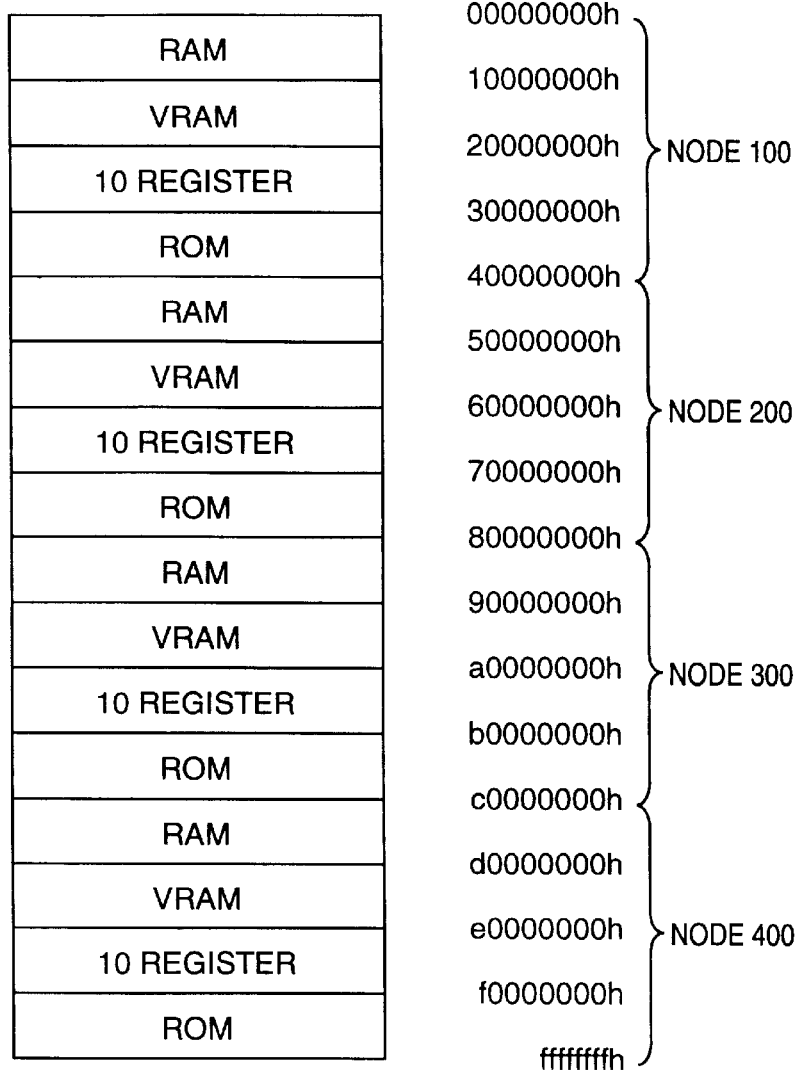
FIG. 2 is a diagram showing an address map of the overall system according to the first embodiment.

FIG. 2 is a diagram showing an address map of the overall system according to the first embodiment. In this embodiment, the address space (four gigabytes) of the overall system is utilized by being allocated to the four nodes. For example, the memory space of the memory 102 in node 100 extends from address "00000000h" to address "3fffffffh". Here the memory 102 has a RAM, a VRAM, an IO register and a ROM to each of which addresses are allocated as shown in FIG. 2. Address spaces are similarly allocated to the memories 202, 302, 402 in the respective nodes 200, 300, 400, as illustrated in FIG. 2.

Assume that the CPU 101 of node 100 loads the data (four bytes) at address 41000000h of RAM 202 in node 200 by utilizing the LR instruction. In such case the reserve flag in CPU 101 becomes valid. This is accompanied by a transition in the state of the RSRV signal line 109 from "L" to "H". Upon detecting this transition in state, the synchronization request detection apparatus 106 generates a synchronization flag registration request packet of the kind shown in FIG. 3.

This series of operations will now be described in greater detail.

Figure 4:
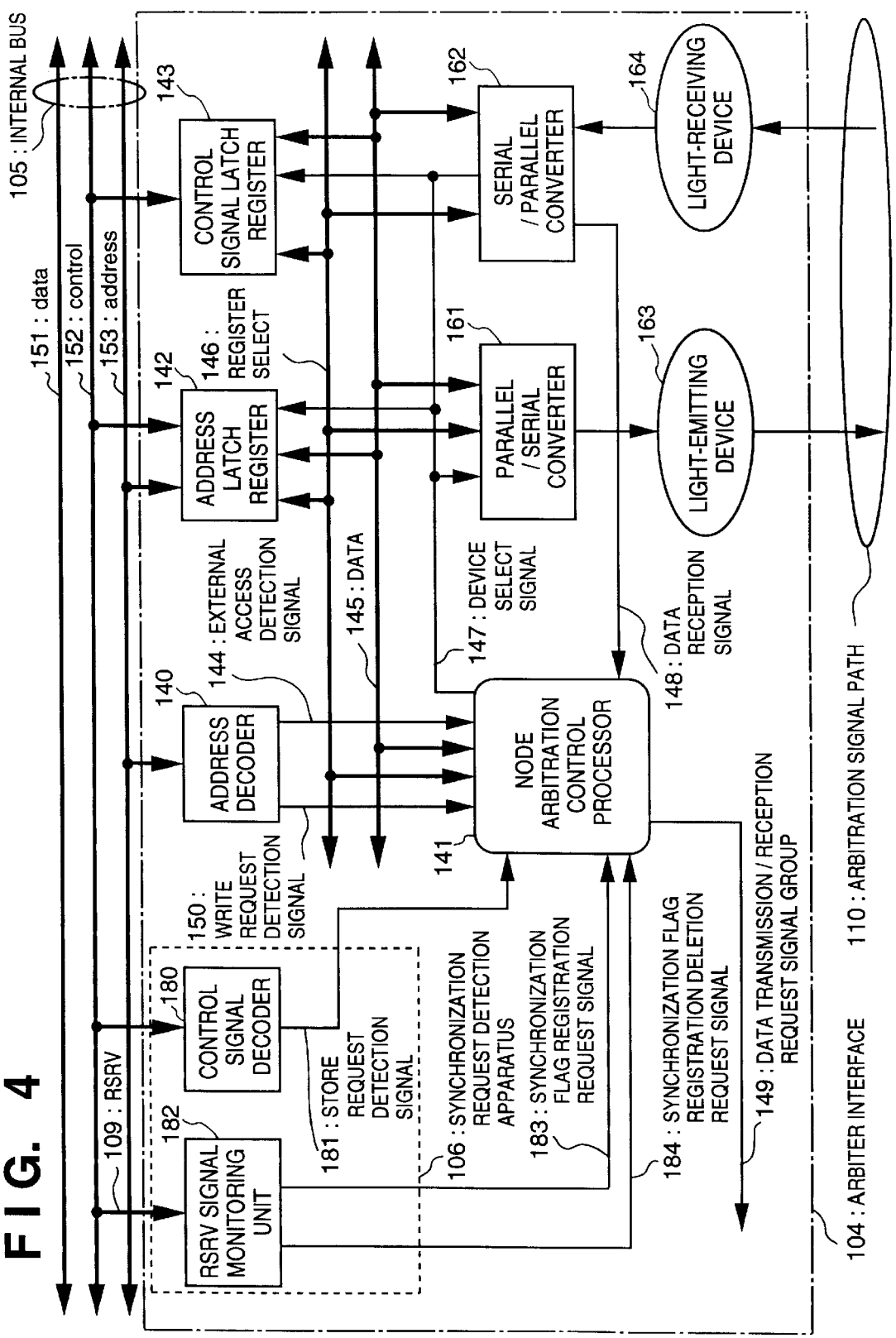
FIG. 4 is a block diagram showing an arbiter interface according to the first embodiment.
Figure 5:
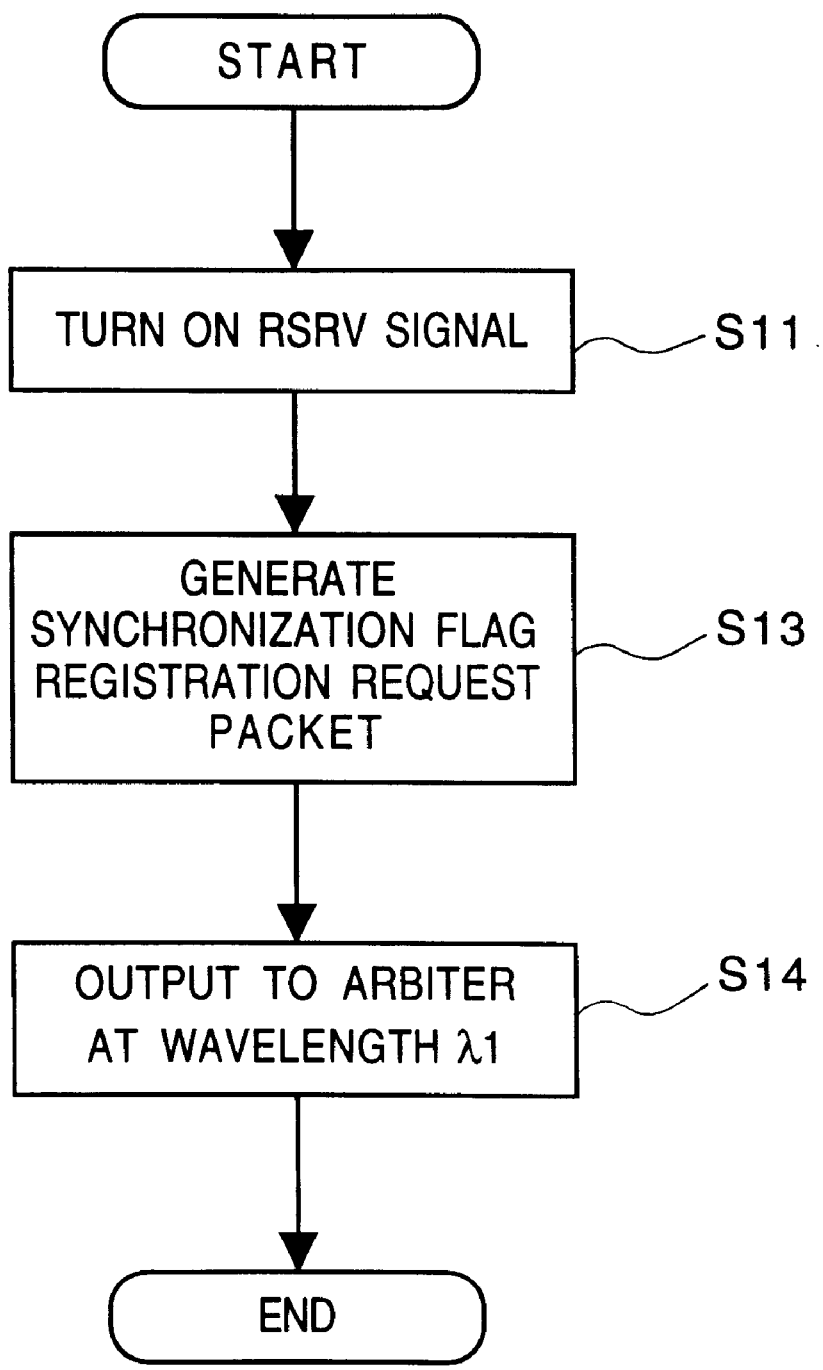
FIG. 5 is a flowchart for describing the processing of the arbiter interface in a case where an RSRV signal 109 has been asserted according to the first embodiment.

FIG. 4 is a block diagram showing the arbiter interface 104. Further, FIG. 5 is a flowchart for describing the processing of the arbiter interface in a case where the RSRV signal 109 has been asserted. It should be noted that the following description will be rendered with regard to the arbiter interface 104. However, the arbiter interfaces 104, 204, 304 of FIG. 1 are all identical in construction and a description of these other arbiter interfaces is omitted.

When the CPU 101 executes the LR instruction, the reserve flag in the CPU 101 is validated and the RSRV signal 109 of the CPU 101 rises to the "H" level, as mentioned above. It should be noted that the CPU 101 also stores the address accessed by the LR instruction. Further, in a case where an LR instruction with respect to another address has been issued in this state, in this embodiment the address accessed most recently is stored.

In FIG. 4, when a RSRV signal monitoring unit 182 in the synchronization request detection apparatus 106 present in the arbiter interface 104 detects that the RSRV signal 109 has changed from "L" to "H", the unit outputs the result as a synchronization flag registration request signal 183 and delivers control to a program run in a node arbitration control processor 141. As a result, the flowchart illustrated in FIG. 5 is started up.

In this embodiment, the node arbitration control processor 141 uses a single-chip microcontroller. However, the architecture of the processor 141 is not limited by this embodiment, for the processor 141 may be constructed from hardware logic, by way of example.

Figure 3:
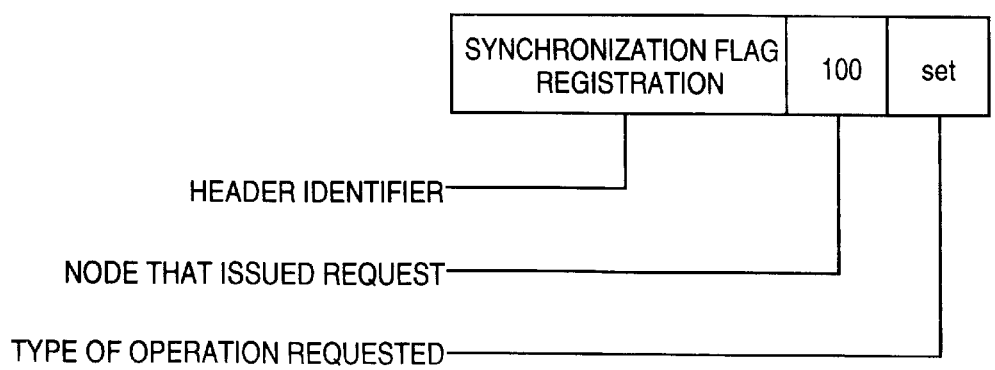
FIG. 3 is a diagram showing the data structure of a synchronization flag registration request packet according to the first embodiment.

Upon receiving the synchronization flag registration request signal 183, the node arbitration control processor 141 advances processing to step S13 in FIG. 5, at which the synchronization flag registration request packet of the kind shown in FIG. 3 is created. As shown in FIG. 3, the field HEADER IDENTIFIER of the packet stores information indicating a request for "synchronization flag registration". The field NODE THAT ISSUED REQUEST stores information for identifying the request-issuing node (100 in this example) of the synchronization flag registration request packet. The field TYPE OF OPERATION REQUESTED is "set" because this packet is a request for registering the synchronization flag.

This packet is written in a parallel/serial converter 161 at step S14. The parallel/serial converter 161 converts the information that has been written in to serial data and outputs the serial data to a light-emitting device 163. The latter photoelectrically converts the input signal and outputs a light signal of wavelength λ1 to the arbiter 20 through a communication line 110 constituted by an optical fiber.

The architecture described above is the same for all nodes. It should be noted that the light-emitting device 161 is a device such as an LED or laser. A light-receiving device 164 is typified by a photodiode.

Thus, the node that has issued the LR instruction outputs the synchronization flag registration request packet to the arbiter 20 at wavelength λ1. The operation of the arbiter 20 that has received the synchronization flag registration request packet will be described with reference to FIGS. 6 and 7.

Figure 6:
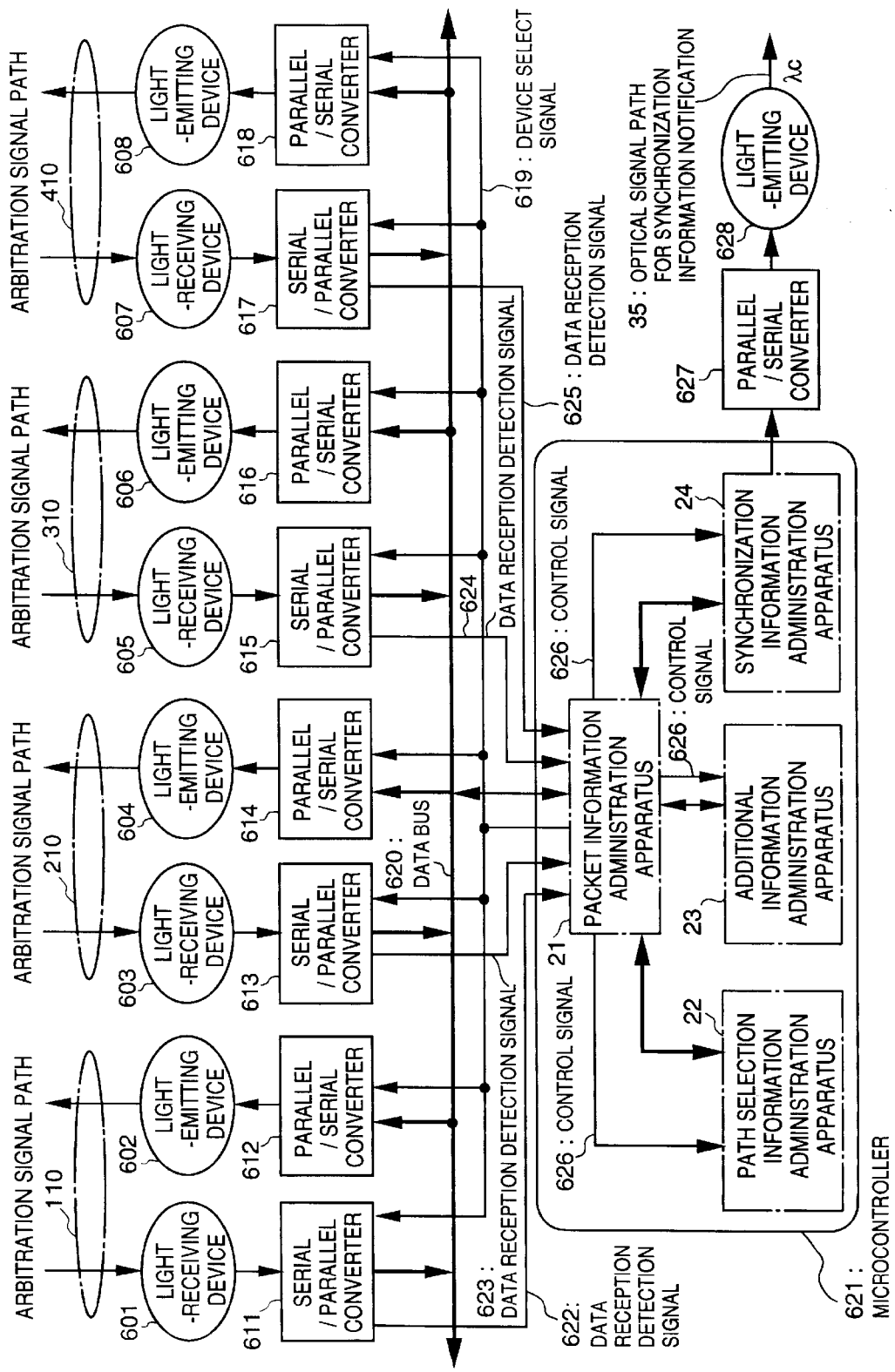
FIG. 6 is a block diagram showing the architecture of the arbiter according to the first embodiment.
Figure 7:
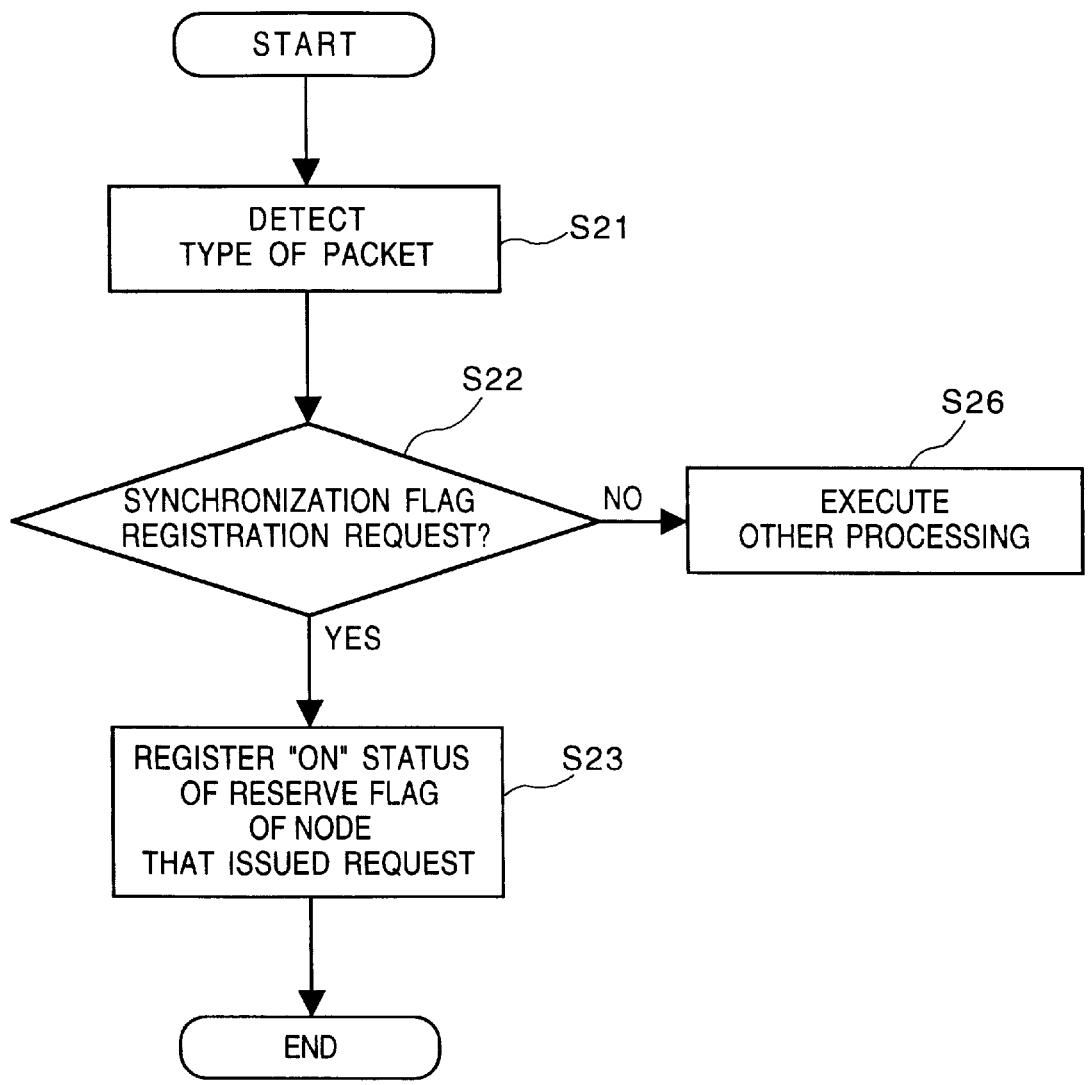
FIG. 7 is a flowchart for describing the operating procedure of an arbiter that has received the synchronization flag registration request packet according to the first embodiment.

FIG. 6 is a block diagram showing the architecture of the arbiter, and FIG. 7 is a flowchart for describing the operating procedure of the arbiter that has received the synchronization flag registration request packet.

As shown in FIG. 6, the arbiter includes light-receiving devices 601, 603, 605 and 607 connected to the respective ones of the nodes for receiving the light signals of wavelength λ1 issued by the respective nodes and converting these light signals to electric signals. The electric signals resulting from the conversion are sent to respective ones of serial/parallel converters 611, 613, 615 and 617.

When the synchronization flag registration request packet arrives from the node 100, it enters the serial/parallel converter 611. The latter converts the entered serial electric signal to a parallel signal. At the same time, the serial/parallel converter 611 notifies the packet information administration apparatus 21 of arrival of the packet by means of a data reception detection signal 622. In this embodiment, the packet information administration apparatus 21 is constituted by a microcontroller 621 having an internal ROM, which stores the program, and a RAM used in processing. Further, it is assumed that the microcontroller includes portions that perform the functions of the path selection information administration apparatus 22, the additional information administration apparatus 23 and the synchronization information administration apparatus 24 simultaneously. It should be noted that the architecture of the arbiter is not limited to that used in this embodiment but can be modified in various ways.

Upon receiving the data reception detection signal 622, the packet information administration apparatus 21 selects the serial/parallel converter 611 by a device select signal 619. The serial/parallel converter 611 outputs the packet, which has been sent from the node 100 via a data bus 620, to the packet information administration apparatus 21 from an internal register. The packet information administration apparatus 21 detects the type of packet (step S21 in FIG. 7). If the result of detection is that this packet is the synchronization flag registration request packet, the contents of this packet are delivered to the portion of the microcontroller 621 that performs the function of the synchronization information administration apparatus 24 (step S22).

On the basis of the information that has been brought to it, the synchronization information administration apparatus 24 registers the fact that the reserve flag as been turned on in the node 100 in an internal table in order to maintain the synchronization among the CPUs across the nodes (step S23).

It should be noted that the process through which the data at address 41000000h of the RAM in node 200 are loaded in the processor 101 inside node 100 is implemented by reading the data between nodes as set forth in the specification of Japanese Patent Application Laid-Open No. 7-143136. The procedure may be summarized as follows:

(1) When a load request is generated at node 100, an arbitration request packet which header is "request" and the type of transfer is "read" (see FIG. 9) is transmitted to the bus arbiter 20.

Figure 11:
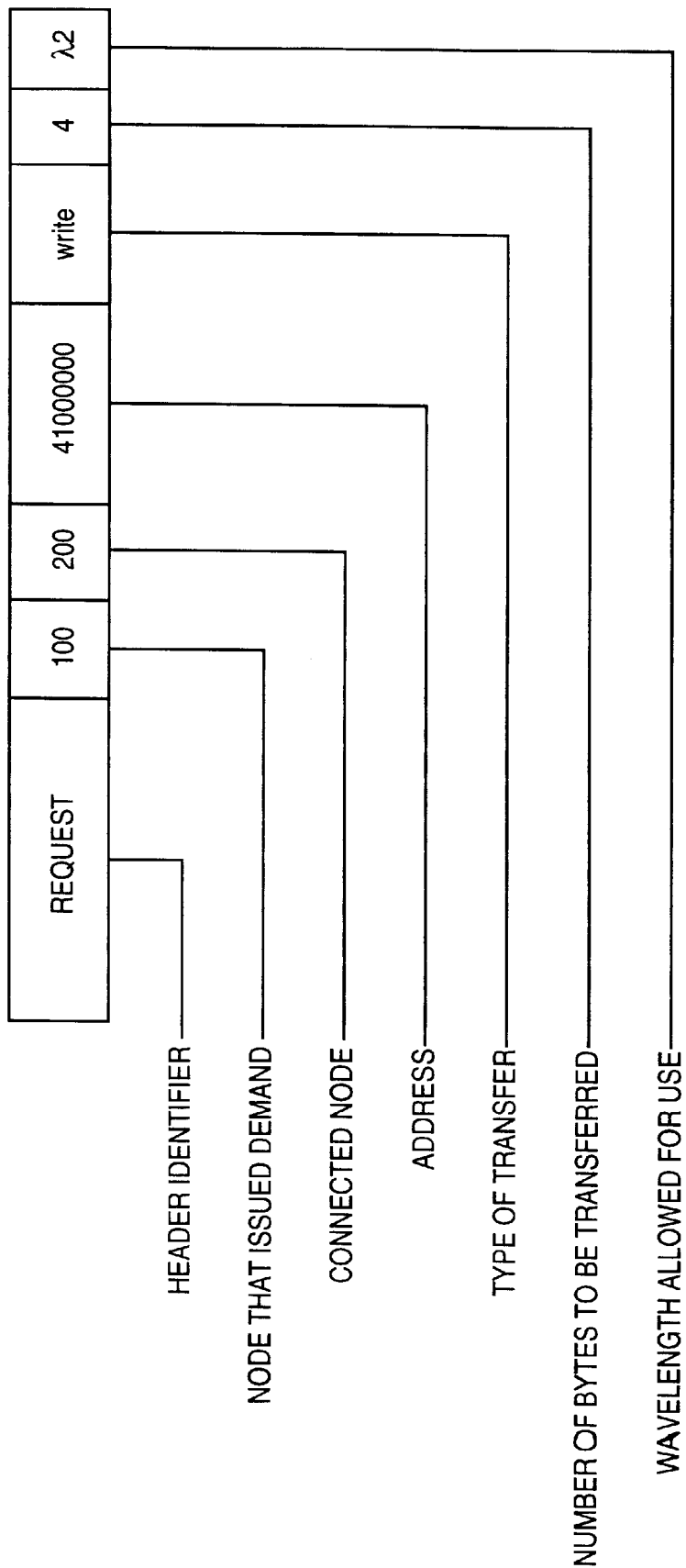
FIG. 11 is a diagram showing an example of the data structure of a connection preparation request packet according to the first embodiment.

(2) Upon receiving the arbitration request packet, the arbiter 20 transmits a connection preparation request packet (see FIG. 11) to the nodes 100, 200.

(3) Upon receiving the connection preparation request packet, the node 200 sets the data communication lines (the wavelength, etc., when the optical fibers 31, 32 are utilized), extracts the address from the contents of the packet and executes bus access for the reading operation within the node 200.

(4) In concurrence with (3) above, the node 100 that has received the connection preparation request packet sets the data communication line (the wavelength, etc., when the optical fibers 31, 32 are utilized).

(5) When the data communication line on the optical fibers 31, 32 has been established, the node 200 sends the node 100 the data loaded at (3) above.

(6) The node 100 causes the data sent from the node 200 to be reflected within the node 100 itself.

Operation when the SC instruction is issued will be described next. Here it is assumed that the CPU 201 of node 200 and the CPU 301 of node 300 have already loaded the data (four bytes) at address 41000000h of RAM 201 in node 200 by utilizing the LR instruction, and that the reserve flags of these nodes have become valid. In a manner similar to that described above, it is assumed that this information also has been sent to the synchronization information administration apparatus 24 inside the arbiter 20, and that the fact that the reserve flags have been turned on in nodes 200 and 300 as well has been registered in the internal table.

Figure 8:
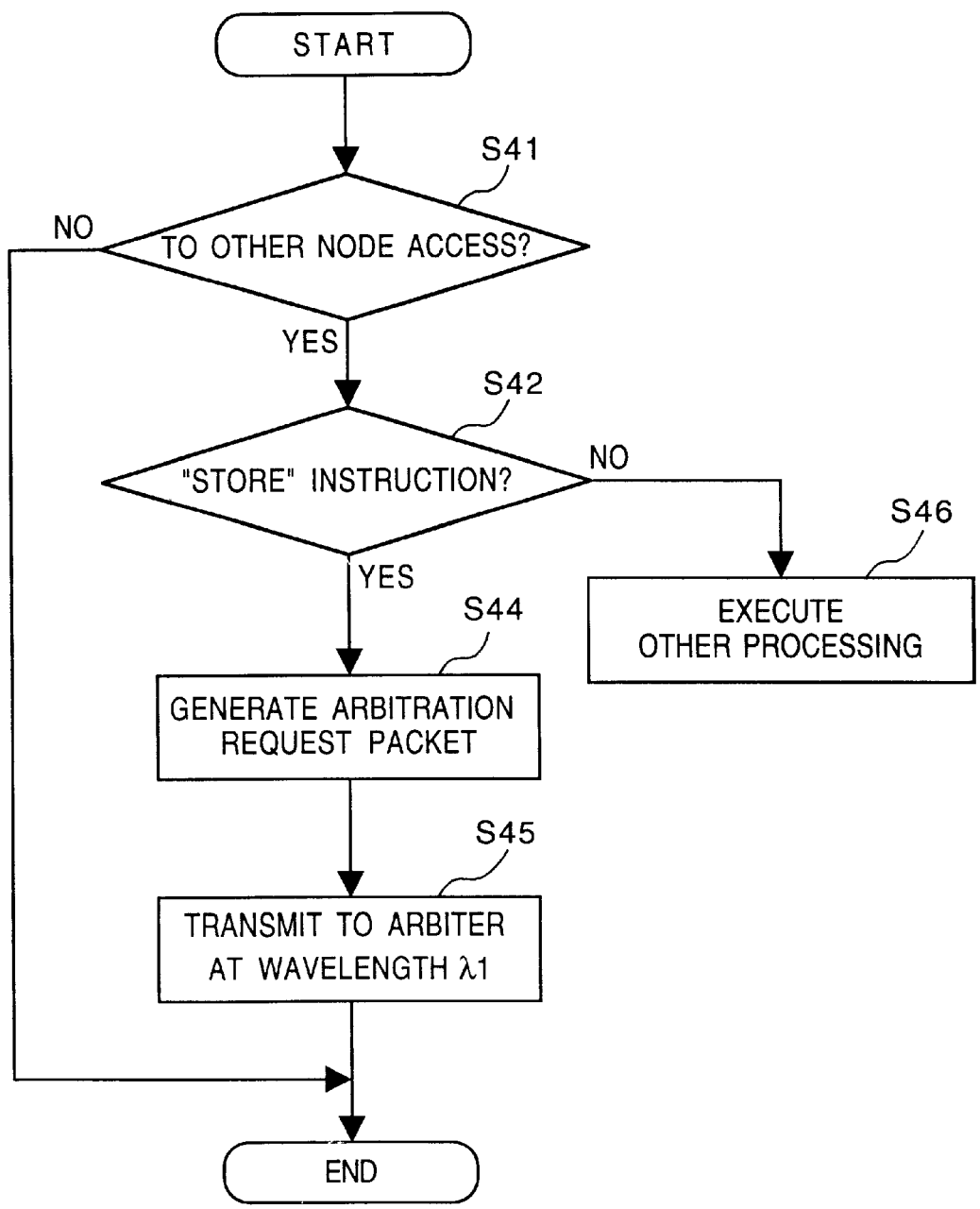
FIG. 8 is a flowchart showing the operation of an arbiter interface that has detected issuance of an SC instruction according to the first embodiment.

The operation of the system for a case where the CPU 101 inside the node 100 issues the SC instruction and invalidates the reserve flags of the nodes 200 and 300 under these circumstances will be described. FIG. 8 is a flowchart showing the operation of the arbiter interface that has detected issuance of the SC instruction according to this embodiment.

In FIG. 4, an address decoder 140 present inside the arbiter interface 104 constantly monitors the internal bus 105 of the node 101. (The internal bus 105 is constituted by data signal line 151, control signal line 152 and address signal line 153.) In a case where it is recognized that accessing to an external node (the node 200 in this instance) has occurred on the bus (where accessing means writing data to address 41000000h), control is handed over, by an external access detection signal 144 and write request detection signal 150, to the program run by the node arbitration control processor 141.

At the same time, the address being issued on the address signal line 153 at this time is latched in an address latch 142, and address information such as a read/write request type (write in this case) and number of transferred bytes (four bytes in this case) is latched in a control signal latch register 143.

At the same time, a control signal decoder 180 present in the synchronization request detection apparatus 106 incorporated in the arbiter interface constantly monitors the control signal line 152. In a case where it is recognized that the store instruction (the SC instruction to address 41000000h in node 200 in this instance) has been generated on the bus, the control signal decoder 180 notifies the program, which is run by the node arbitration control processor 141, of the possibility that synchronized control is required. This notification is given by a store demand detection signal 181.

More specifically, at step S41 in FIG. 8, it is detected whether accessing to another node has occurred on the bus. If the answer is "YES", then the program proceeds to step S42. Here it is determined, based upon the write request detection signal 150 and store request detection signal 181, whether the store instruction has been issued. If the answer is "YES", then the program proceeds to step S44; otherwise, the program proceeds to step S46 and other processing is executed.

Figure 9:
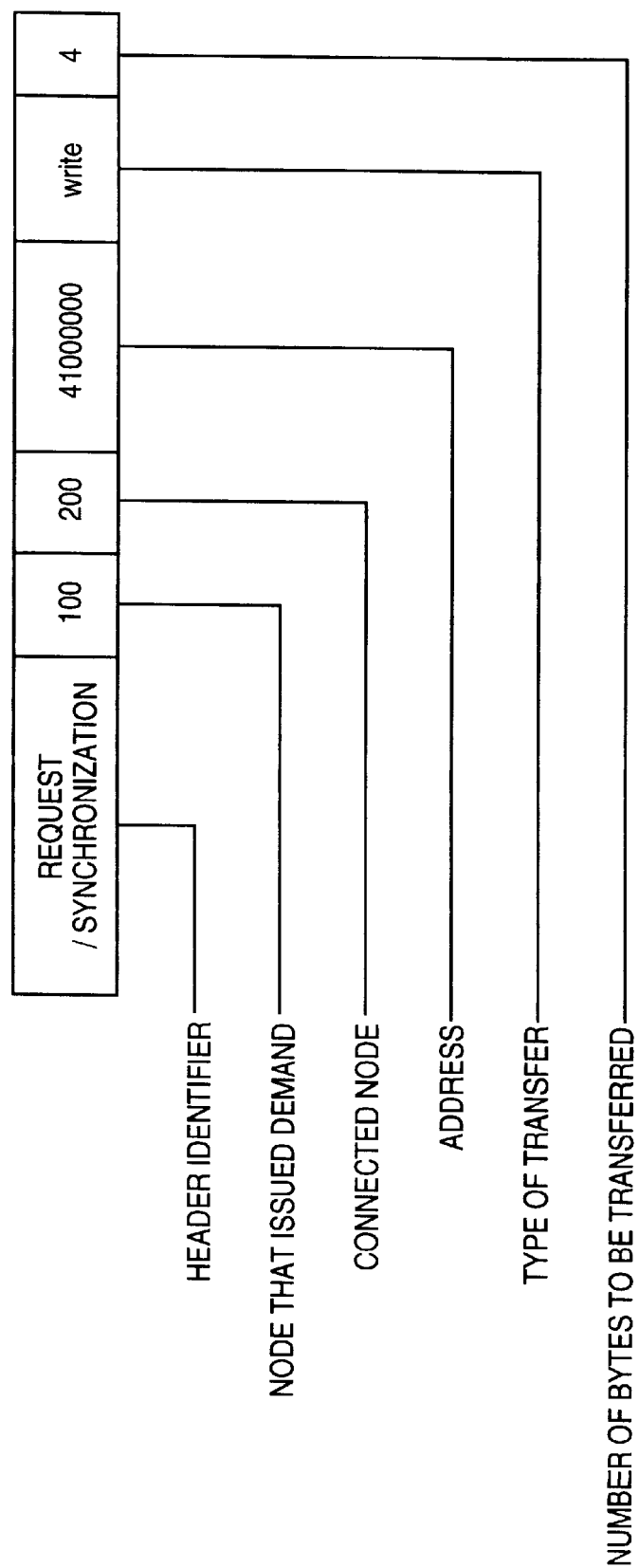
FIG. 9 is a diagram showing an example of the data structure of an arbitration request packet according to the first embodiment.

Upon receiving notification of the external access detection signal 144, write request detection signal 150 and store request detection signal 181, the node arbitration control processor 141 reads out the signals latched by the address latch 142 and control signal latch 143, discriminates the destination of the connection and creates the arbitration request packet of the kind shown in FIG. 9 (step S44). The packet shown in FIG. 9 is a path request and has the function of communicating a synchronized control request to the arbiter.

The arbitration request packet that has been created is written in a parallel/serial converter 161. The latter converts the written information to serial data and outputs the serial data to the light-emitting device 163. The latter photoelectrically converts the entered signal and outputs a light signal of wavelength λ1 to the arbiter 20 through the communication line 110 constituted by the optical fiber (step S45).

Figure 10:
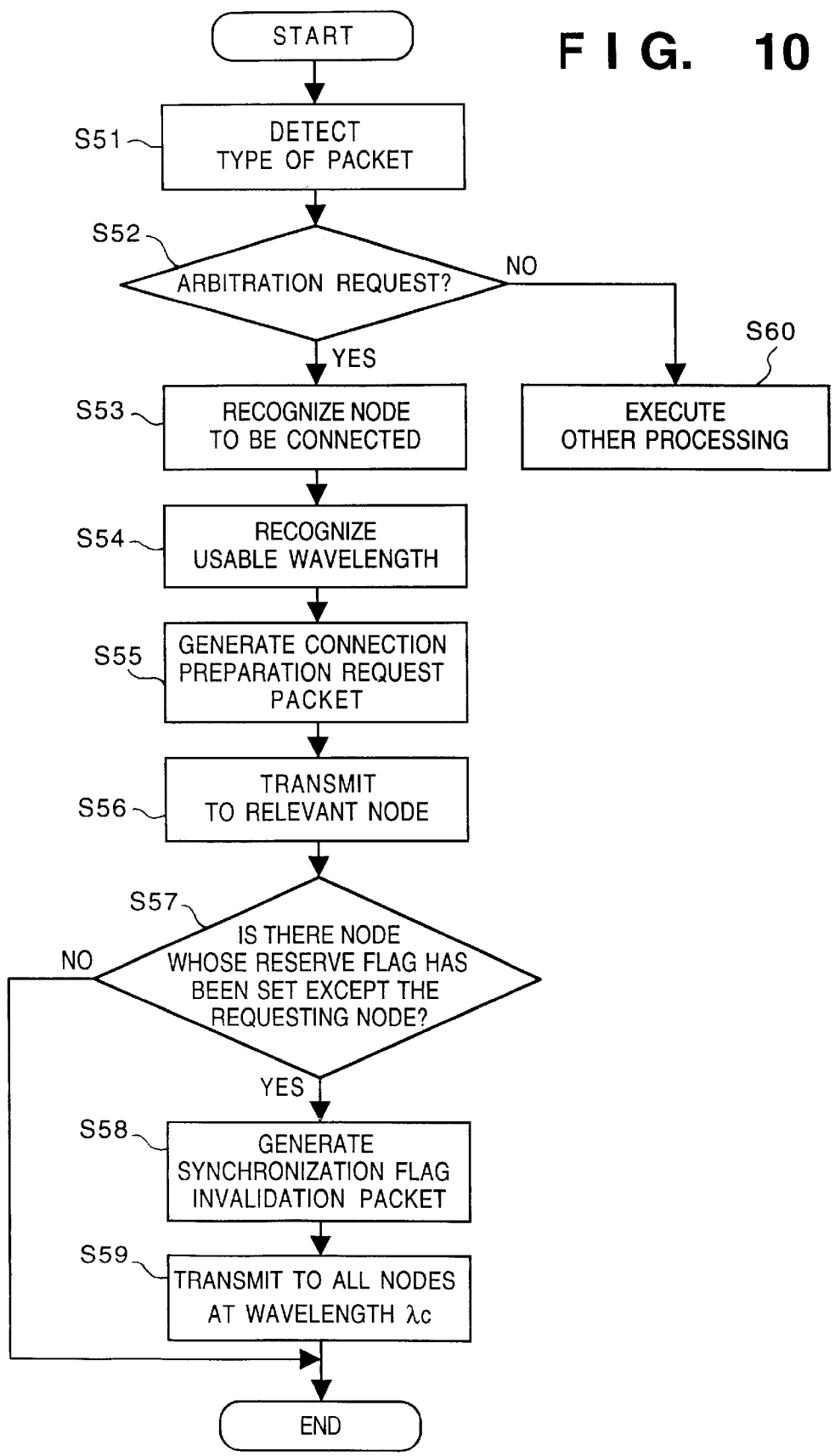
FIG. 10 is a flowchart showing the operation of an arbiter 20 in a case where the arbitration request packet has arrived according to the first embodiment.

The operation of the arbiter 20 that has received this arbitration request packet will now be described with reference to FIGS. 6 and 10. FIG. 10 is a flowchart showing the operation of an arbiter 20 in a case where the arbitration request packet has arrived.

When the arbitration request packet is received from the node 100 in FIG. 6, the packet enters the serial/parallel converter 611. The latter converts the entered serial electric signal to a parallel signal and this is communicated to the packet information administration apparatus 21 by the data reception detection signal 622.

Upon receiving the data reception detection signal 622, the packet information administration apparatus 21 selects the serial/parallel converter 611 by the device select signal 619. The packet information administration apparatus 21 reads out the arbitration request packet, which has been sent from the node 100 through the data bus 620, from an internal register of the serial/parallel converter 611.

More specifically, the packet information administration apparatus 21 judges the type of packet that has entered (step S52). If the packet is the arbitration request packet, then the program proceeds to step S53. If the packet is other than that of an arbitration request, then the program proceeds to step S60 and other processing is executed.

Of the information contained in the arbitration request packet, the information of the requesting node number is delivered to the path selection information administration apparatus 22. The portion of the additional information concerning data transfer is stored in the portion of the microcontroller that performs the function of the additional information administration apparatus 23. Furthermore, when it is judged that this packet is one that accompanies the operation for maintaining synchronization among CPUs, the operation for maintaining synchronization among the CPUs at the nodes is required. Consequently, the address in the request packet and such information as the requesting node number are stored in the portion of the microcontroller that performs the function of the synchronization information administration apparatus 24.

The path selection information administration apparatus 22 analyzes the read data and recognizes the fact that this transmission line use request is a request from the node 100 to the node 200 (step S53). The path selection information administration apparatus 22 checks an internally provided flag indicating the state of use of the transmission line, as well as the wavelength being used. If the transmission line is in a usable state, the path selection information administration apparatus 22 sets the flag to the in-use state (step S54). Furthermore, the path selection information administration apparatus 22 creates the connection preparation request packet shown in FIG. 11 (step S55) and writes this packet in the serial/parallel converter 612 corresponding to node 100 and in the serial/parallel converter 614 corresponding to node 200.

The connection preparation request packets contain the information obtained from the portion of the microcontroller that performs the function of the additional information administration apparatus 23, as well as the wavelength information. These two connection preparation request packets are outputted to the nodes 100 and 200 using light signals of wavelength λ1, similar to the case of the optical arbiter interface. It should be noted that by virtue of the fact that the four nodes use different wavelengths λ2, λ3 for data communication, it is possible for communication in two systems to be performed simultaneously between a pair of nodes.

Figure 12:
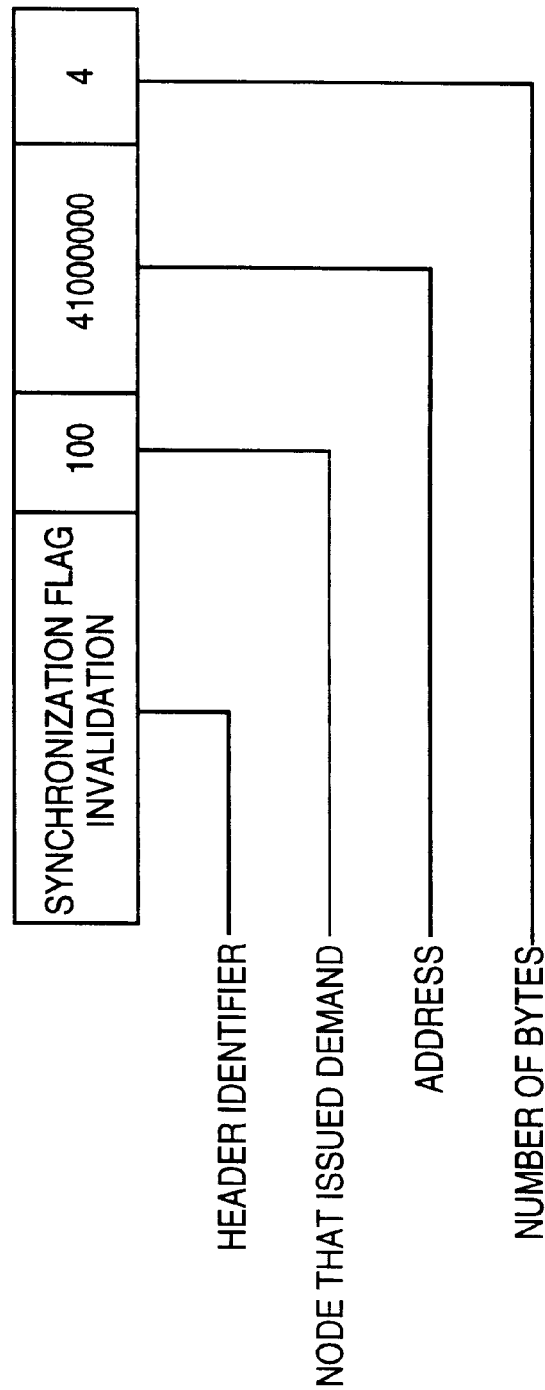
FIG. 12 is a diagram showing an example of the data structure of a synchronization flag invalidation packet according to the first embodiment.

Next, in order to maintain synchronization among the CPUs at each of the nodes, the synchronization information administration apparatus 24 determines, on the basis of the information that has been brought to it, whether the reserve flag is currently on in any node other than the connection requesting node (step S57). Since notification has already been received through the synchronization flag registration request packets from the nodes 100, 200 and 300 in this case, the existence of a node whose reserve flag is ON is recognized. Accordingly, in a case where the reserve flag has been set in correspondence with the address 41000000h, a synchronization flag invalidation packet of the kind shown in FIG. 12 is created (step S58) in order to indicate the fact that the reserve flag is to be invalidated. The synchronization information administration apparatus 24 writes this packet in the parallel/serial converter 627.

In a case where the result of checking the internal table indicates that the reserve flags are not valid in any node other than the connection requesting node, the series of operations for designating flag invalidation is not carried out.

By using a wavelength of λc, the written packet is sent out on the optical signal path 35, which is for giving notification of synchronization information, via the light-emitting device 628, and the packet enters the star coupler 50 in the concentrator 30. It is assumed that wavelength λc is different from the wavelengths λ2, λ3, which are used in data transmission, in order to prevent interference. The synchronization flag invalidation packet that has entered the star coupler 50 is outputted to each node through the optical fibers 31, 32, 33, 34 (step S59).

Figure 13:
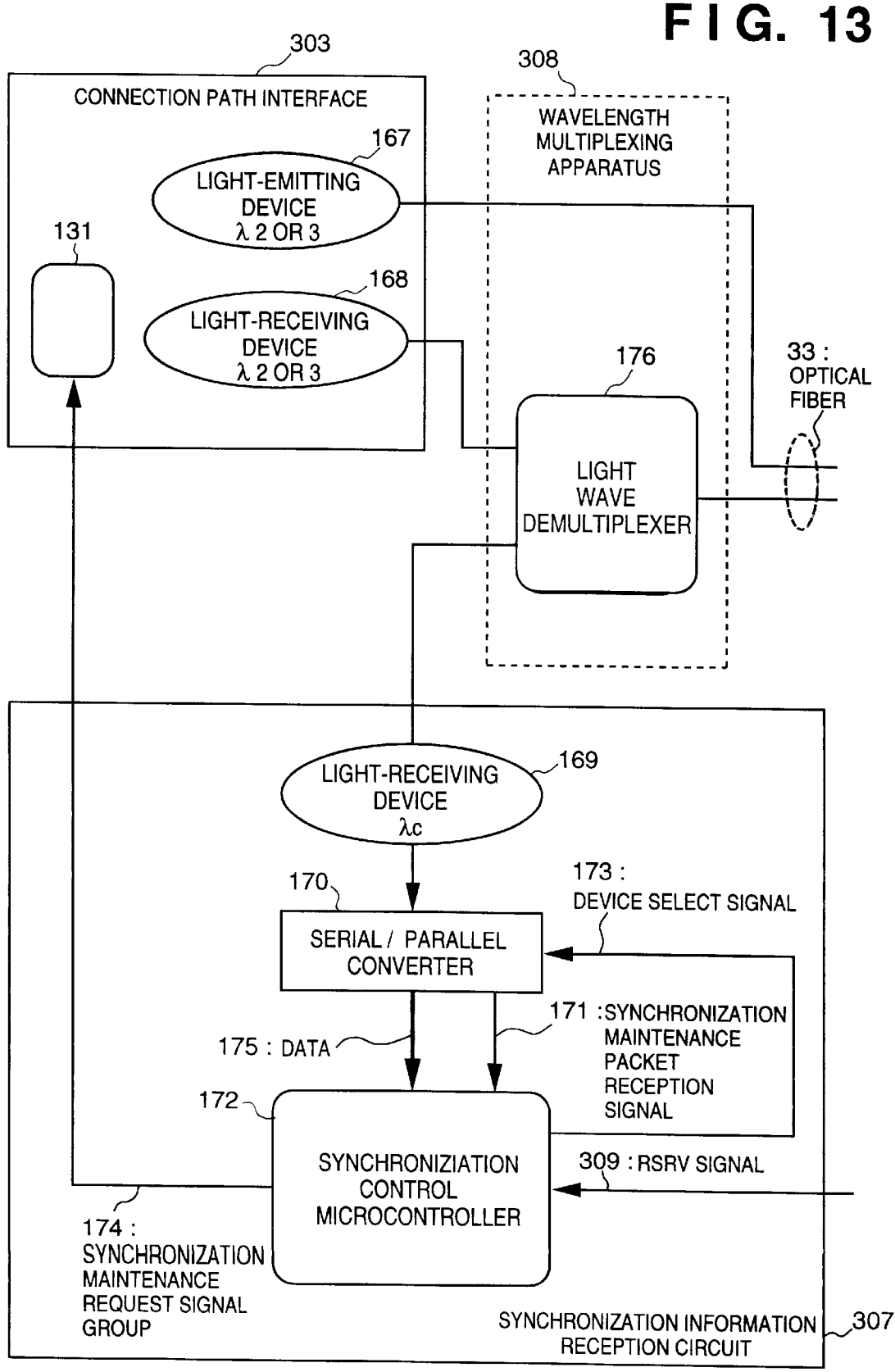
FIG. 13 is a block diagram illustrating a synchronization information receiving circuit 307 and a wavelength multiplexing apparatus 308 according to the first embodiment.
Figure 14:
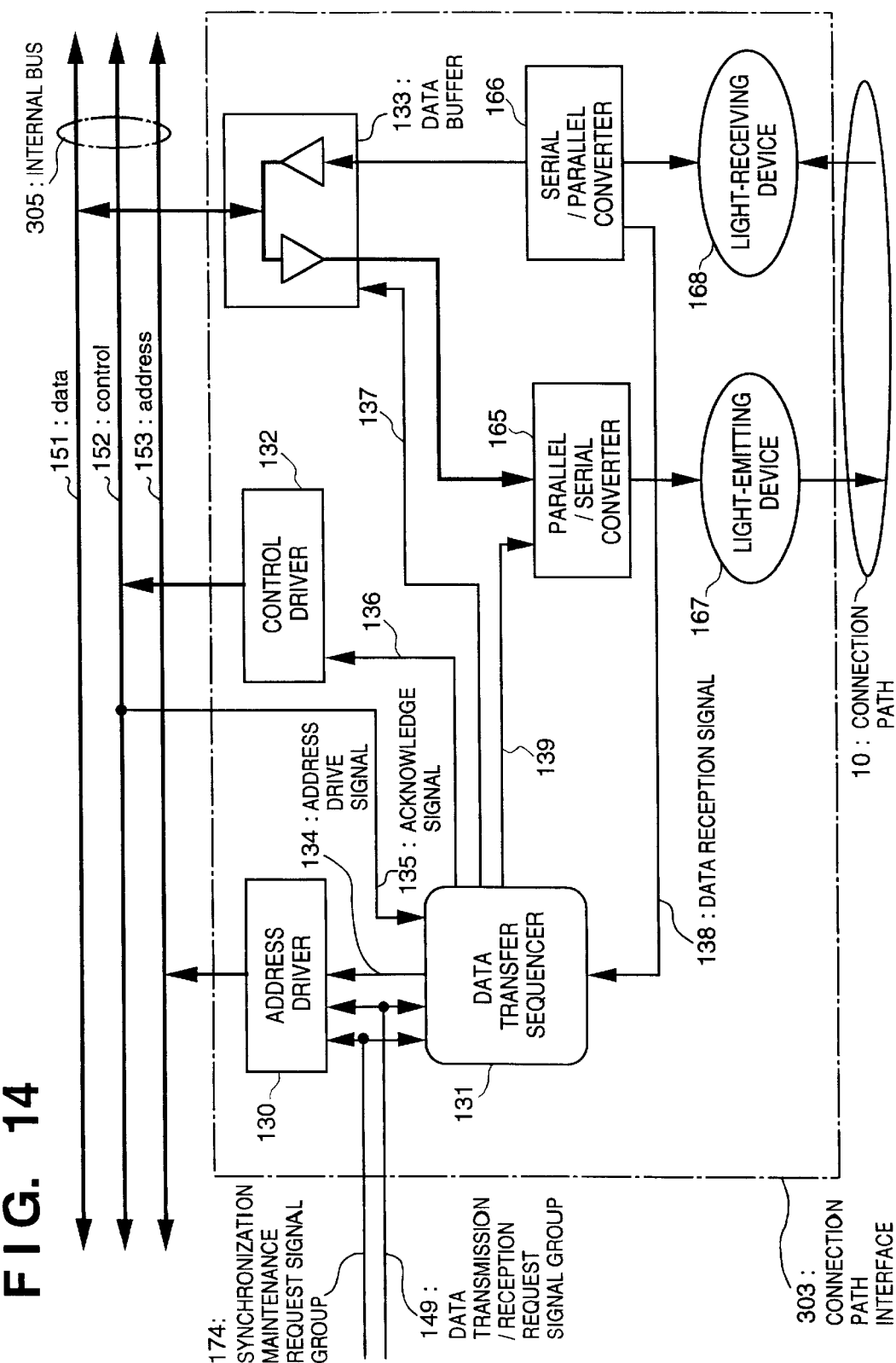
FIG. 14 is a block diagram showing the architecture of a connection path interface according to the first embodiment.
Figure 15:
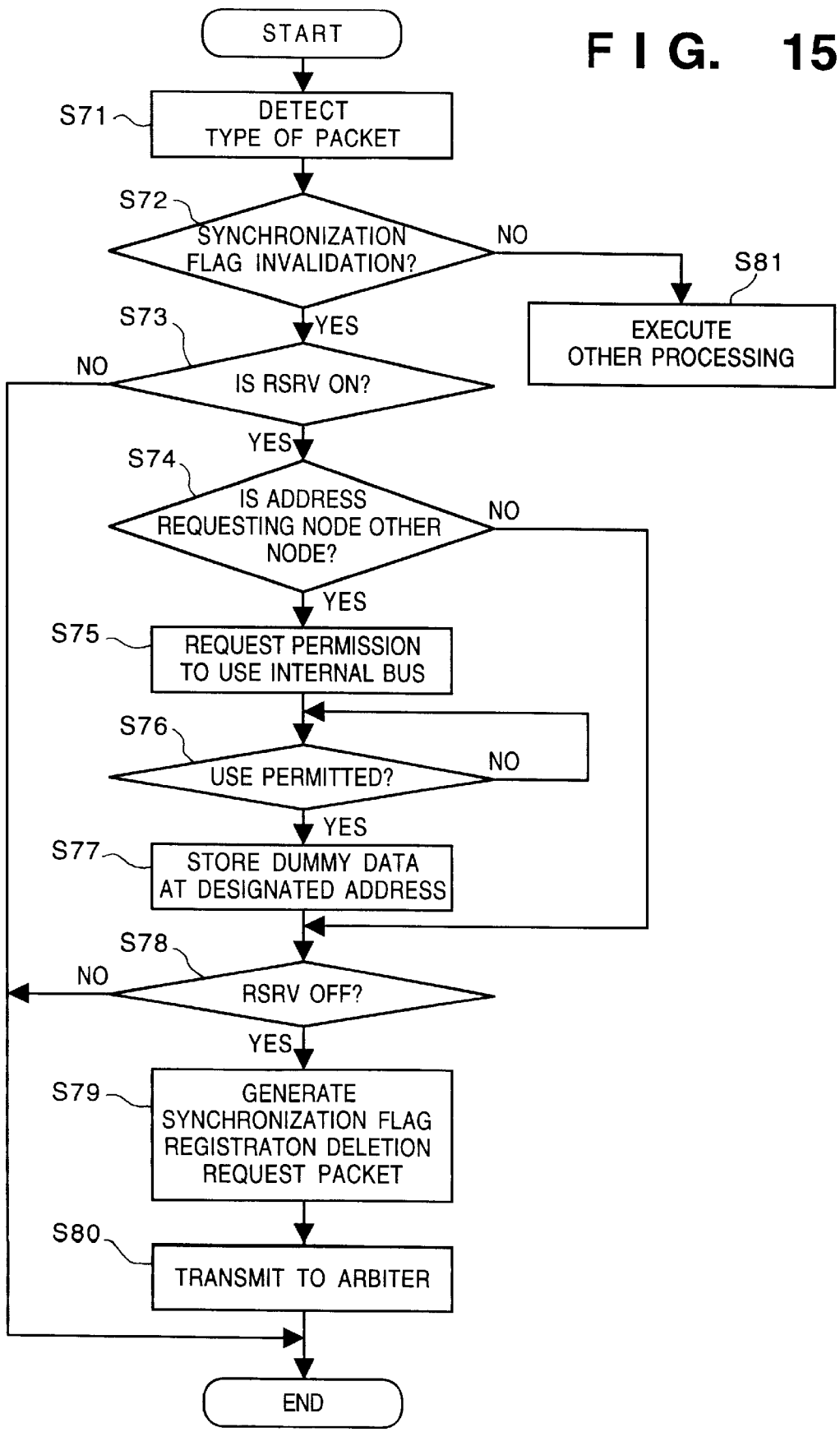
FIG. 15 is a flowchart for describing the operation of a node that has received the synchronization flag invalidation packet according to the first embodiment.

Next, the reserve flag invalidation operation for maintaining synchronization between CPUs at nodes 200 and 300 will be described with reference to FIGS. 13, 14 and 15 taking the operation of node 300 as an example. FIG. 13 is a block diagram illustrating the architecture of the synchronization information receiving circuit 307 and wavelength multiplexing apparatus 308, FIG. 14 is a block diagram showing the architecture of a connection path interface, and FIG. 15 is a flowchart for describing the operation of a node that has received the synchronization flag invalidation packet according to this embodiment.

As shown in FIG. 13, the light signal that has entered from the optical fiber 33 is separated by a light wave demultiplexer 176 into light (λ2 or λ3) directed toward the connection path interface 303 and light (λc) directed toward the synchronization information receiving circuit 307. The light of wavelength λc that has entered the synchronization information receiving circuit 307 is converted to an electric signal by a light-receiving device 169, and the electric signal is converted to a parallel signal by a serial/parallel converter 170. At the same time, a synchronization control microcontroller 172 is notified by a synchronization maintenance packet reception signal 171. At this time the microcontroller 172 checks the status of the RSRV signal line 309. Maintenance of synchronization is required when the RSRV signal line 309 is at the "H" level (i.e., when the reserve flag is valid).

More specifically, when notification is given of the arrival of the packet, the synchronization control microcontroller 172 of node 300 reads the packet out of the serial/parallel converter 170 using a device select signal 173 and a data bus 175 and detects the type of packet (step S71). In a case where this packet is the synchronization flag invalidation packet, the controller 172 checks the RSRV signal line 309. If the signal line 309 is in the ON state and the address indicated by this packet is the address of another node, then the program proceeds to step S75 (steps S72, S73 and S74).

The synchronization control microcontroller 172 reads out the synchronization flag invalidation packet and directs a request into the node to request permission to use the internal bus 305. When permission to use the internal bus 305 is given, the synchronization control microcontroller 172 uses a synchronization maintenance request signal group 174 to contact the connection path interface 303 and instruct a CPU, which has set the reserve flag with relation to address 41000000h, to issue a bus access for invalidating this flag on internal bus 305 on the basis of the contents of the packet shown in FIG. 9 (steps S76, S77).

The processing of step S77 will be described further with reference to an example of more detailed architecture of the connection path interface 303 of FIG. 14. Here the address (41000000h) is sent to an address driver 130 and the request for invalidation of the synchronization flag is sent to a data transfer sequencer 131 by way of the synchronization maintenance request signal group 174. More specifically, in this case the storage of dummy data of address 41000000h on internal bus 305 is designated.

The data transfer sequencer 131 instructs the address driver 130, by means of an address drive signal 134, to drive the address 41000000h. In addition, the data transfer sequencer 131 instructs a control driver 132, via a signal line 136, of the transfer size and to drive a control signal, which is for executing the store instruction, on the bus. Further, the data transfer sequencer 131 instructs a data buffer 133, via a signal line 137, to drive the dummy data out on the bus.

The processor 301 that has monitored the dummy-data store processing as SS inspects the reserve flag which it itself possesses as well as a register storing the address employed in setting this flag. In the case of this embodiment, the addresses coincide and, hence, this reserve flag is invalidated.

When the reserve flag is invalidated, the RSRV signal line 309 undergoes a transition from "H" to "L". When the RSRV signal monitoring unit 182 (see FIG. 4) in the synchronization request detection apparatus 306 present in the arbiter interface 304 detects that the status of the RSRV signal has changed from "H" to "L", the unit 182 outputs the result as a synchronization flag registration deletion request signal 184 and hands over control to the program run by the node arbitration control processor 141.

It should be noted that in a case where the reserve flag is not invalidated (e.g., a case where the reserve flag has been set in correspondence with an address other than the address designated by the synchronization flag invalidation packet), the status of the RSRV signal is held at "H" and the processing of FIG. 15 is terminated at step S81. Further, in a case where the RSRV signal does not attain the OFF state, e.g., where a plurality of CPUs exist in one node and reserve flags are turned ON at addresses that differ from one another, the RSRV signal of a given CPU is turned OFF and the RSRV signals of the other CPUs are held in the ON state. As a result, in a case where the OR of the RSRV signals from these CPUs is taken and adopted as the RSRV signal (309) of this node, the RSRV signal of this node is not turned OFF.

Figure 16:
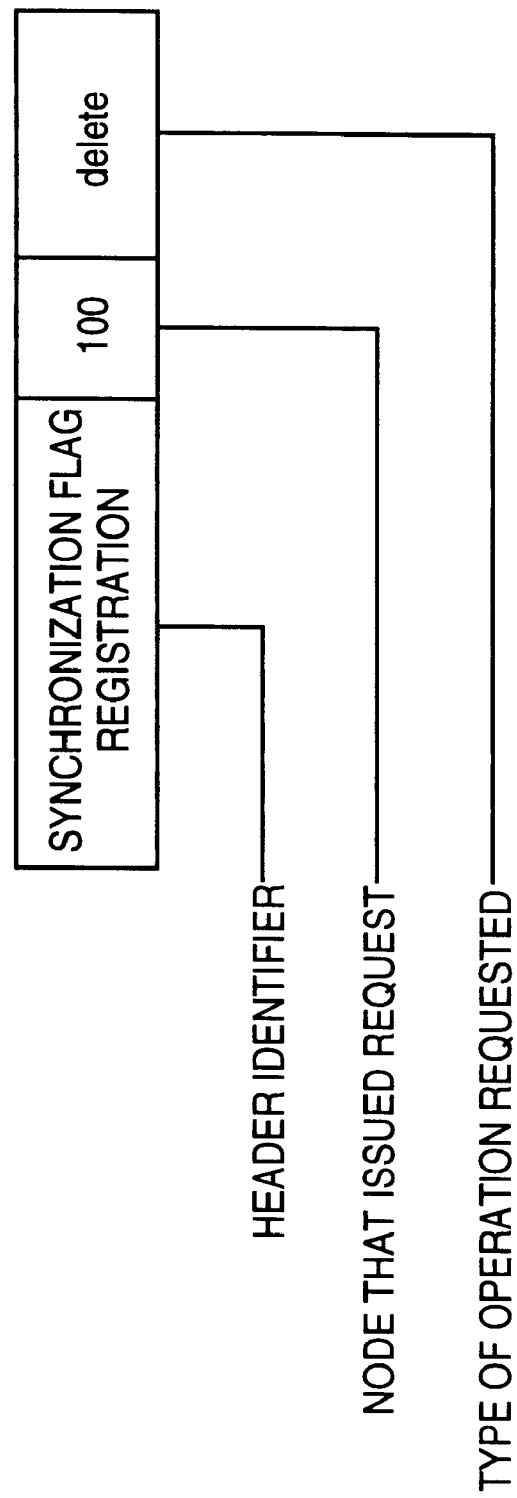
FIG. 16 is a diagram showing an example of the data structure of a synchronization flag registration deletion request packet according to the first embodiment.

Upon receiving the synchronization flag registration deletion request signal 184, the node arbitration control processor 141 creates a synchronization flag registration deletion request packet of the kind shown in FIG. 16 and sends this packet to the arbiter 20 (steps S78–S80).

Figure 17:
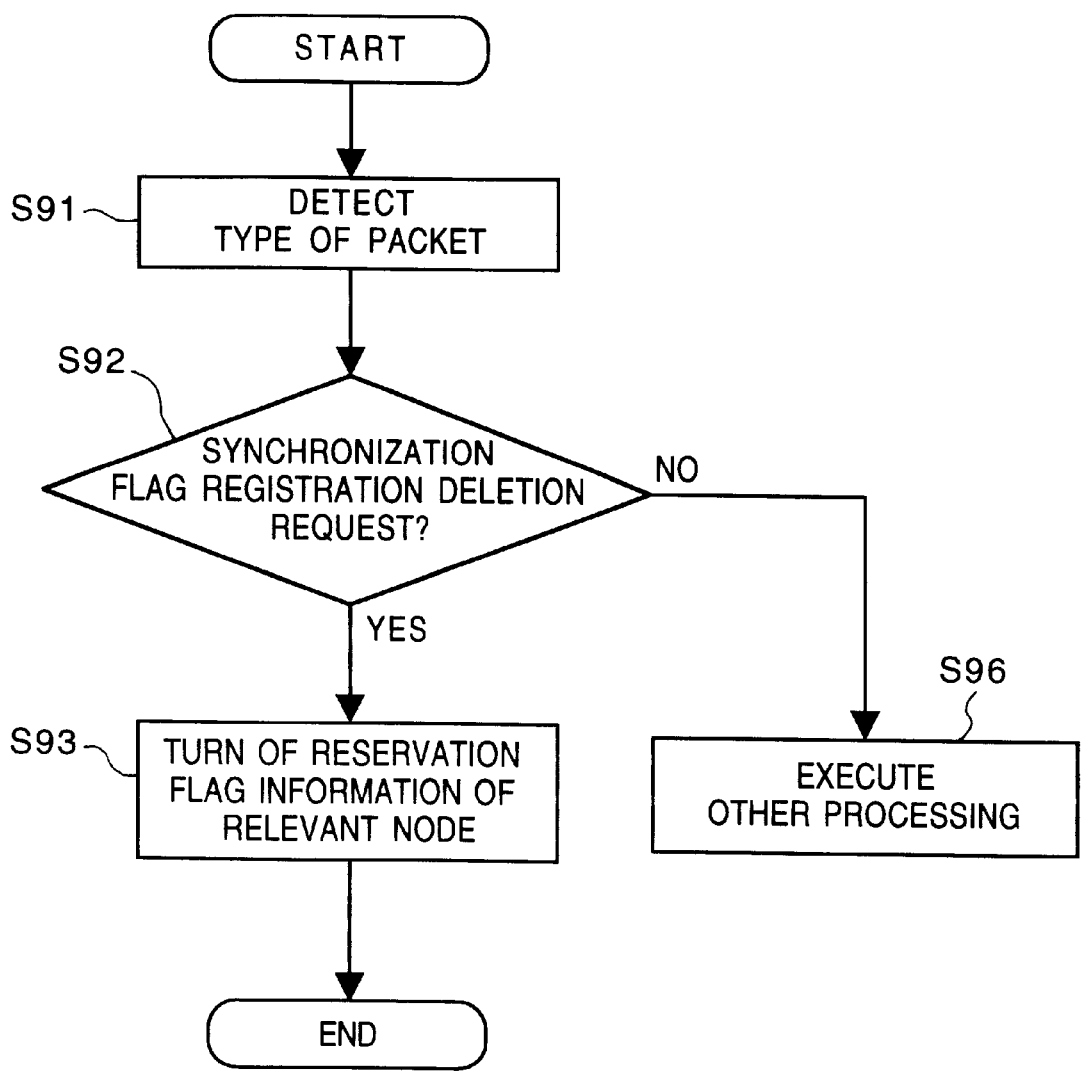
FIG. 17 is a flowchart for describing the operation of an arbiter that has received the synchronization flag registration deletion request packet according to the first embodiment.

The operation of the arbiter that has received the synchronization flag registration deletion request packet will be described with reference to FIG. 17.

First, the packet information administration apparatus 21 detects the type of packet received and advances processing to step S93 if the packet is the synchronization flag registration deletion request packet (steps S91, S92). Upon receiving the synchronization flag registration deletion request packet, the arbiter 20 delivers the packet to the synchronization information administration apparatus 24. On the basis of the information received, the synchronization information administration apparatus 24 deletes information indicating that the reserve flag of the node 300 is valid from the information that has been registered in the internal table (step S93).

On the other hand, since the relevant address does not exist in the memory 302, this store processing is ignored. In order to prevent a bus from running out of time, the data transfer sequencer instructs the control driver 132 to drive an acknowledge signal after a fixed delay.

The synchronization flag invalidation packet is sent to the nodes 100, 200 and 400 as well. However, since the status of the RSRV signal line 409 in node 400 is "L" (i.e., the reserve flag is not valid), processing on the internal bus 405 is not executed (step S73 in FIG. 15.) Further, at the node 100 making the request, the synchronization flag invalidation packet is received, the contents of the packet are interpreted and, at the stage that its own node number is found to be in the request issuing field within this packet, subsequent processing that should be executed by this packet is ignored (step S74 in FIG. 15). However, when the reserve flag becomes OFF as a result of SC instruction, the change of the status is detected, and the procedure at steps 78–80 is performed.

Furthermore, at node 200, which is the destination of the data transfer, the synchronization flag invalidation packet is received, the contents of the packet are interpreted and, at the stage that its own node address is found to be within this packet, subsequent processing that should be executed by this packet is ignored (step S74 in FIG. 15).

It may also be considered that this series of operations in the node 300 is defined as an address-only transaction in a system using a CPU of the type in which address bus control and data bus control are independent. In this case, the processing for reserve flag invalidation is such that processing is completed merely in the address phase and implementation is possible in a form that is not accompanied by driving of the dummy data on the bus.

At node 200, which is the correct destination of data transfer, transfer is carried out and processing for storing data is executed as indicated in the specification of Japanese Patent Application Laid-Open No. 7-143136. With regard to storing of the data, the procedure is similar to that for loading, described earlier. This storage of data is a formal data transfer, unlike the situation at node 300, but SS is executed in a manner similar to the operation at node 300. Thus, inspection of the synchronization flag of the CPU is carried out and the reserve flag is invalidated, as a result of which synchronized operation is assured. It should be noted that the transmission of the synchronization flag registration deletion request packet to the arbiter 20 attendant upon the invalidation of the synchronization flag is performed in the same way as at the node 300.

As a result, the operation for maintaining synchronization between CPUs attendant upon execution of the SC instruction at node 100 is implemented. It goes without saying that processing is executed in similar fashion in transfers between other nodes as well.

In the first embodiment, light of wavelength $\lambda 1$ is used for the light signals on the arbitration signal lines 110, 210, 310, 410 and light of wavelengths $\lambda 2$, $\lambda 3$ (where $\lambda 2$ and $\lambda 3$ are different) is used for the light signals on the connection paths 31, 32, 33, 34. However, $\lambda 1 = \lambda 2$, $\lambda 1 = \lambda 3$ also is permissible in terms of architecture.

Figure 18:
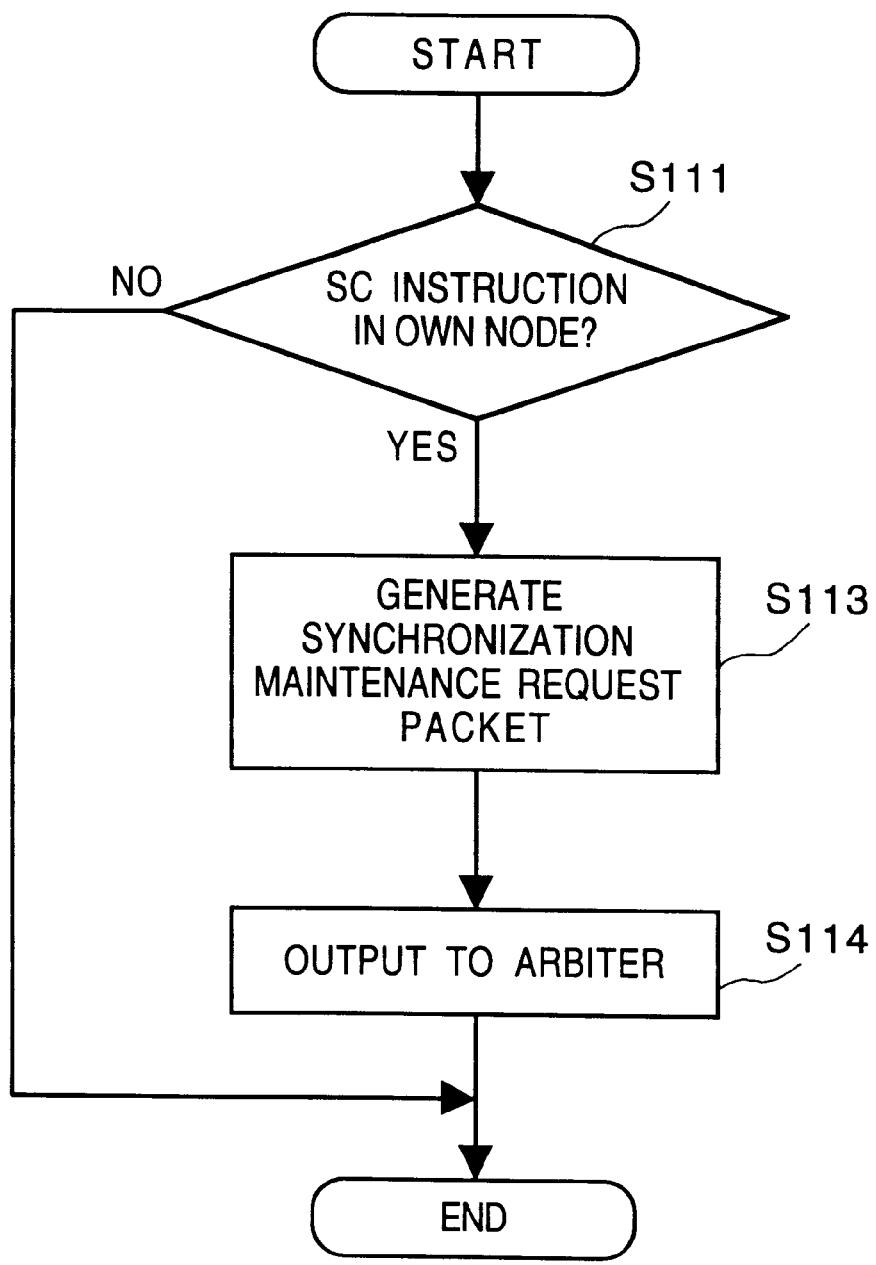
FIG. 18 is a flowchart useful in describing an operation for maintaining synchronization in a case where an SC instruction has been issued within a node itself according to the first embodiment.

A concrete example of operation will be described below in case of a synchronization instruction to data in the memory within a node per se, i.e., a case where the CPU in the node 100 loads data (four bytes) of data at address 01000000h of the RAM within this node, which data are utilizable in a synchronization instruction, by utilizing the LR instruction, and an attempt is made to change this by issuing the SC instruction. Specifically, how the operation for maintaining synchronization accompanying this is executed will be described with reference to FIG. 18. FIG. 18 is a flowchart useful in describing an operation for maintaining synchronization in a case where the SC instruction has been issued within a node itself.

In FIG. 4, control is handed over to the program, which is run by the node arbitration control processor 141, by the write request signal 150 and store request signal 181 without the external access detection signal 144 reacting. At the same time, the address being issued on the address signal line 153 at this time is latched in the address latch register 142 and control information such as the number of transfer bytes (four) is latched in the control signal latch register 143.

First, the node arbitration control processor 141 advances processing from step S111 to step S113 when the SC instruction is issued. At step S113, the node arbitration control processor 141 reads out the signals latched by the address latch 142 and control signal latch 143, creates a synchronization maintenance request packet of the kind shown in FIG. 19 and writes this packet in the parallel/serial converter 161. The latter converts the written synchronization maintenance request packet to serial data and outputs the serial data to the light-emitting device 163. The later photoelectrically converts the input signal and outputs the result, as a light signal of wavelength $\lambda 1$, to the arbiter 20 through the communication line 110 constituted by an optical fiber (step 114).

Figure 20:
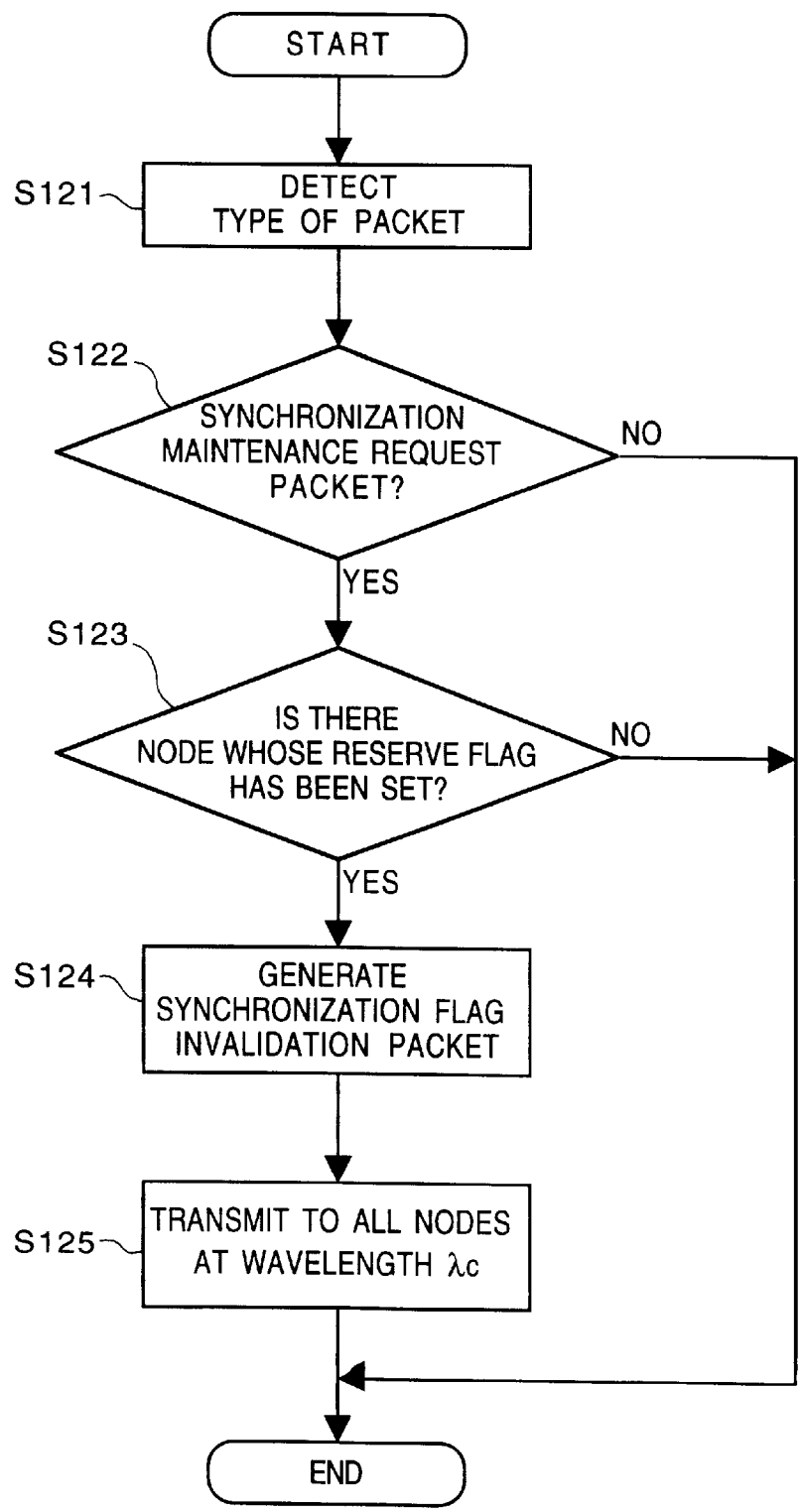
FIG. 20 is a flowchart for describing the operation of an arbiter that has received the synchronization maintenance request packet according to the first embodiment.

Processing executed by the arbiter that has received the synchronization maintenance request packet will now be described with reference to FIG. 20. FIG. 20 is a flowchart for describing the operation of the arbiter that has received the synchronization maintenance request packet.

When the synchronization maintenance request packet arrives from the node 100 and enters the serial/parallel converter 611, the latter converts the input serial electric signal to a parallel signal. The packet information administration apparatus 21 is notified of this by the data reception detection signal 622. Upon receiving the data reception detection signal 622, the packet information administration apparatus 21 selects the serial/parallel converter 611 by the device select signal 619 and reads out the synchronization maintenance request packet, which has been sent from the node 100 through the data bus 620, from the internal register.

More specifically, upon detecting arrival of the packet by the data reception detection signal 622, the packet information administration apparatus 21 reads out this packet and discriminates the type thereof (step S121). If the packet is the synchronization maintenance request packet, the packet information administration apparatus 21 stores the information indicating the address, number of transfer bytes and requesting node number contained in the packet in the portion of the microcontroller that performs the function of the synchronization information administration apparatus 24. The processing from step S123 onward is then executed.

The synchronization information administration apparatus 24 examines the internal table and determines whether there is a node whose reserve flag is valid (step S123). If a node whose reserve flag is valid exists, except for the maintenance request packet sender processing proceeds to step S124. In order to maintain synchronization among the CPUs across the nodes, each node is instructed to invalidate the reserve flag if the reserve flag has been set with the data at address 01000000h as the target. To this end, the synchronization flag invalidation packet described in connection with FIG. 12 is created and this packet is written in the parallel/serial converter 627. The data written in is converted to a light signal by the light-emitting device 628 and the light signal is distributed to all nodes by the star coupler 50.

The processing from this point onward is the same as described in the earlier example and need not be described again.

Thus, in accordance with this embodiment as described above, information necessary for executing synchronized operation within a node or between nodes is transmitted to an arbiter via a transmission line that is different from a connection path, and the arbiter again distributes part of this information to each of the nodes based upon this information, whereby the information can be reflected inside the node per se based upon the information thus distributed. When an operation for maintaining synchronization among CPUs is executed, the processing that accompanies synchronized operation by the CPUs across nodes is reduced and load in terms of performing synchronized operation is alleviated. This makes it possible to improve the processing capability of the overall system.

[Second Embodiment]

In the first embodiment described above, a state in which synchronized operation is being executed is detected by utilizing a signal (referred to as an RSRV signal), which indicates the status of a reserve flag, outputted by a CPU as information for implementing synchronization among CPUs across nodes. Synchronization among CPUs is achieved by sending information regarding "store" to the related nodes only when the above-mentioned state is detected. However, with this technique of controlling the exchange of necessary information in order to execute synchronized operation between nodes by referring solely to the status of the RSRV signal line in each node in accordance with the first embodiment, it is required that the information be sent to each node even in cases where synchronized operation is not taking place within a node. Further, in a case where an SC instruction with respect to the interior of a node itself has been generated, whether any other nodes are in synchronization cannot be determined. As a consequence, it is necessary to transmit synchronization information to the arbiter as a first step.

Accordingly, in the second embodiment, the states of the RSRV lines 109, 209, 309, 409 in the system having the architecture of FIG. 1 are communicated to the arbiter 20 whenever necessary. The arbiter 20 centrally administers the synchronization information and transmits the states of the RSRV lines in the overall system to each node. Thus, in the second embodiment, the synchronization information is transmitted from each node to the arbiter 20 as necessary and the synchronization information is broadcast from the arbiter 20 to each node as necessary. If the system operates in this manner, a synchronization mechanism among CPUs connected by a connection path in which buses cannot monitor one another can be achieved and the processing capability of the overall system can be improved over the first embodiment.

Components identical with those of the first embodiment will be designated by like reference symbols. Further, since the processing described in the second embodiment is almost the same as that executed in the first embodiment, only the processing of the second embodiment that differs from the processing of the first embodiment will be described in detail.

First, the processing described using the flowchart of FIG. 5 of the first embodiment is almost the same as the processing of the second embodiment. In the second embodiment, however, an arbiter interface of the kind shown in FIG. 21 is used.

Assume that the CPU 101 of node 100 loads the data (four bytes) at address 41000000h of RAM 202 in node 200 by utilizing the LR instruction. In such case the reserve flag in CPU 101 becomes valid. This is accompanied by a transition in the state of the RSRV signal line 109 from "L" to "H". Upon detecting this transition in state, the synchronization request detection apparatus 106 first checks to determine whether the LR instruction that caused this transition in state was directed to an address within its own node or is for making access outside the node. Since this is for access outside the node in this case, the synchronization request detection apparatus 106 generates the synchronization flag registration request packet. FIG. 3 illustrates the data structure of the synchronization flag registration request packet. It should be noted that this packet is not generated when the addresses "00000000h" to "3fffffffh" within the node are detected.

This series of operations will now be described in greater detail.

Figure 21:
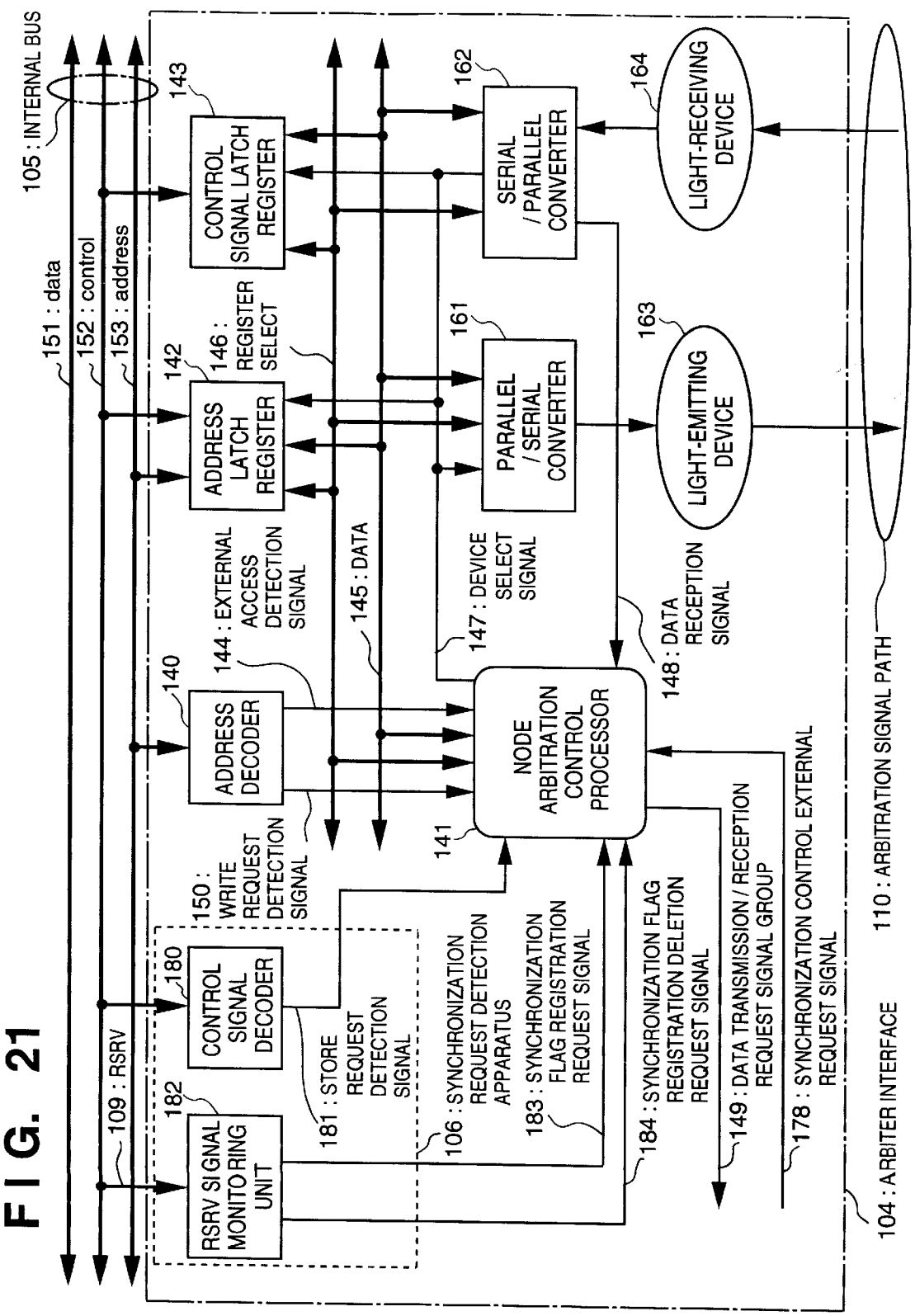
FIG. 21 is a block diagram the arbiter interface 104 according to a second embodiment of the present invention.
Figure 22:
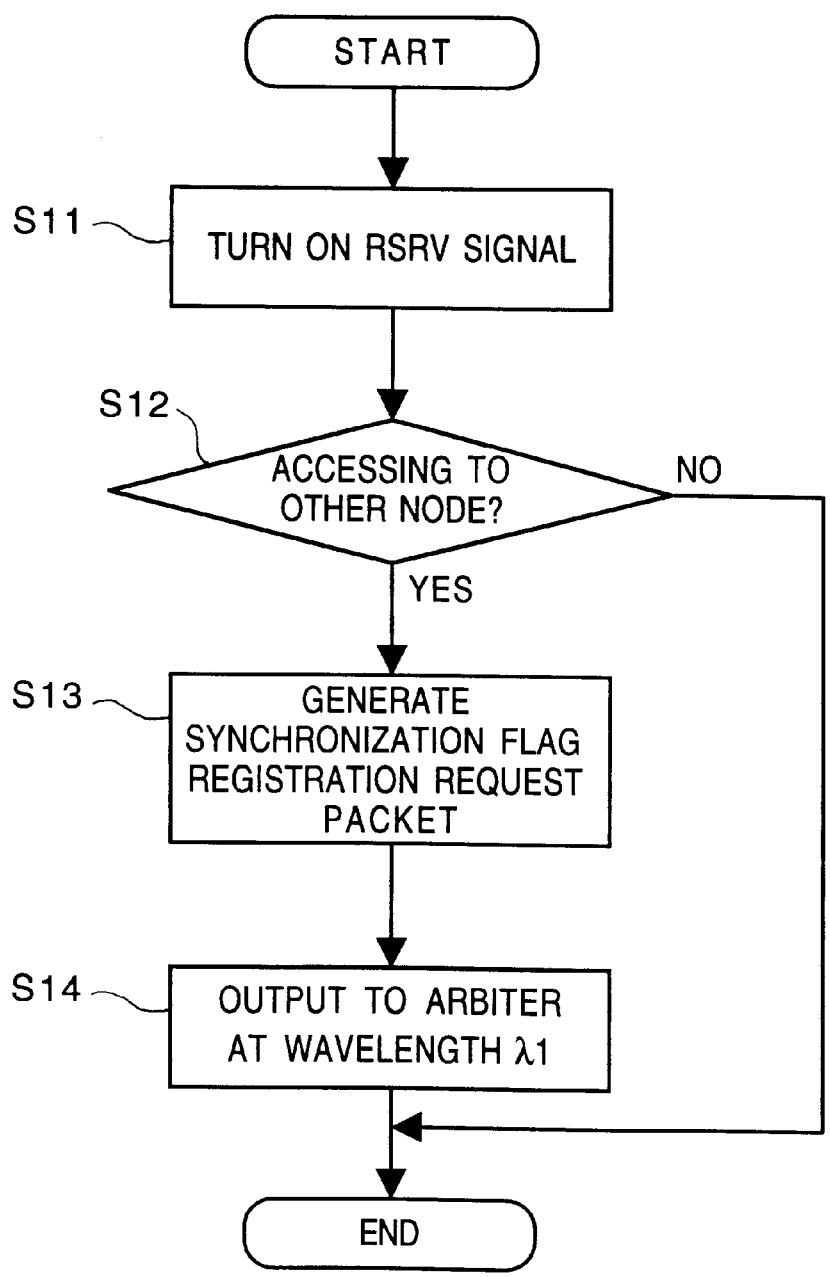
FIG. 22 is a flowchart for describing the processing of the arbiter interface in a case where the RSRV signal 109 has been asserted according to the second embodiment.

In FIG. 21, when the RSRV signal monitoring unit 182 in the synchronization request detection apparatus 106 present in the arbiter interface 104 detects that the RSRV signal 109 has changed from "L" to "H", the unit outputs the result as the synchronization flag registration request signal 183 and delivers control to the program run in the node arbitration control processor 141. As a result, the flowchart illustrated in FIG. 22 is started up.

In the second embodiment, the node arbitration control processor 141 uses a single-chip microcontroller. However, the architecture of the processor 141 is not limited by the first embodiment, for the processor 141 may be constructed from hardware logic, by way of example.

Upon receiving the synchronization flag registration request signal 183, the node arbitration control processor 141 examines the external access detection signal 144 outputted by the address decoder 140 and determines whether this indicates accessing to an external node (step S12).

If accessing to an external node is recognized, the program proceeds to step S13, at which the synchronization flag registration request packet of the kind shown in FIG. 3 is created. As shown in FIG. 3, the field HEADER IDENTIFIER of the packet stores information indicating a request for "synchronization flag registration". The field NODE THAT ISSUED REQUEST stores information for identifying the request-issuing node (100 in this example) of the synchronization flag registration request packet. The field TYPE OF OPERATION REQUESTED is "set" because this packet is a request for registering the synchronization flag.

This packet is written in the parallel/serial converter 161 at step S14. The parallel/serial converter 161 converts the information that has been written in to serial data and outputs the serial data to the light-emitting device 163. The latter photoelectrically converts the input signal and outputs a light signal of wavelength λ1 to the arbiter 20 through the communication line 110 constituted by an optical fiber.

The architecture described above is the same for all nodes. It should be noted that the light-emitting device 161 is a device such as an LED or laser. The light-receiving device 164 is typified by a photodiode.

Thus, the node that has issued the LR instruction to another node outputs the synchronization flag registration request packet to the arbiter 20 at wavelength λ1.

Figure 23:
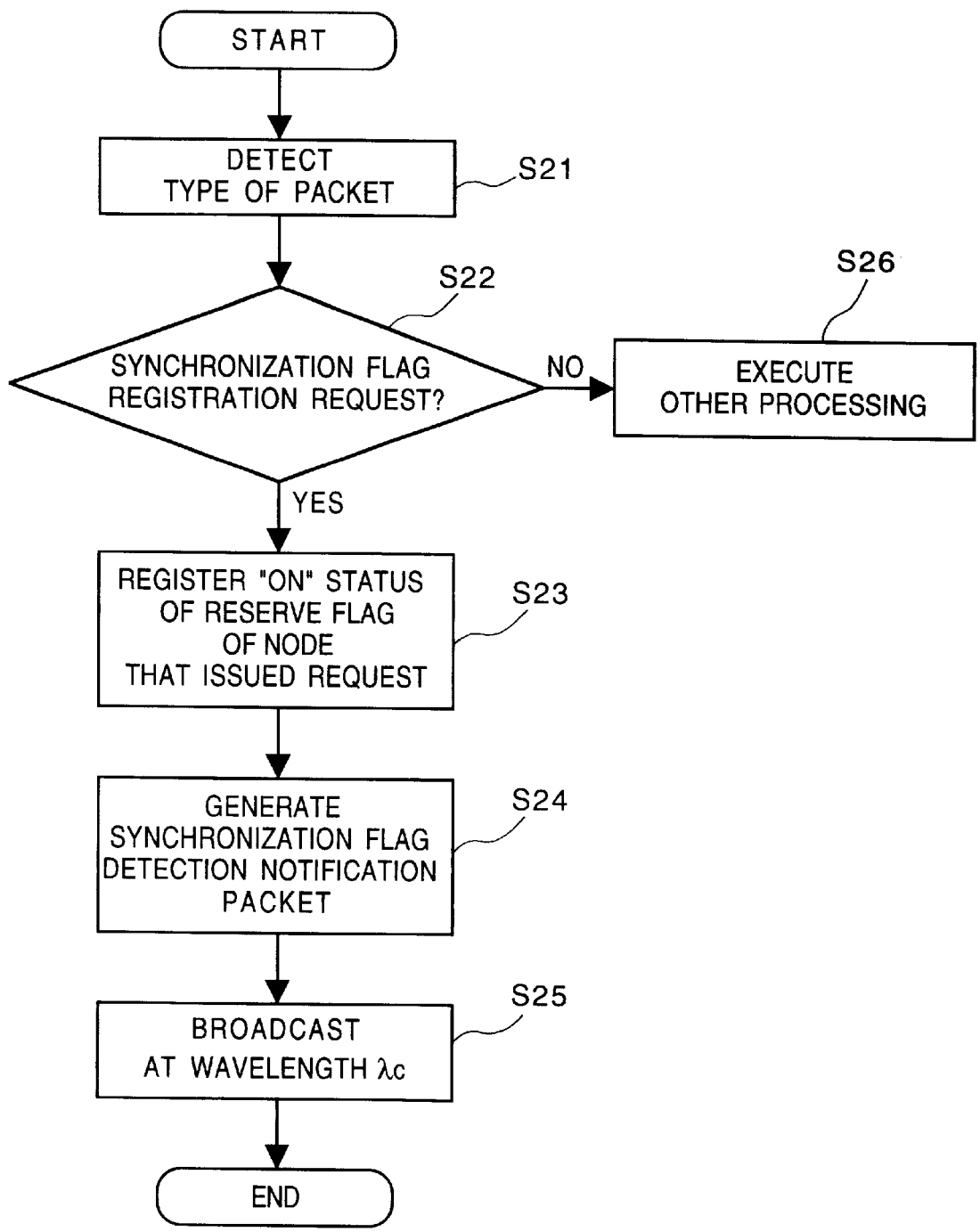
FIG. 23 is a flowchart for describing the operating procedure of an arbiter that has received the synchronization flag registration request packet according to the second embodiment.

After the processing executed at step S23 described in connection with the flowchart of FIG. 7 according to the first embodiment, the processing of steps S24 and S25 in the flowchart of FIG. 23 are executed according to the second embodiment. The arbiter for executing this processing is the arbiter described in connection with FIG. 6 of the first embodiment.

FIG. 23 is a flowchart for describing the operating procedure of the arbiter that has received the synchronization flag registration request packet according to the second embodiment.

Upon receiving the data reception detection signal 622, the packet information administration apparatus 21 selects the serial/parallel converter 611 by the device select signal 619. The serial/parallel converter 611 outputs the packet, which has been sent from the node 100 via a data bus 620, to the packet information administration apparatus 21 from an internal register. The packet information administration apparatus 21 detects the type of packet (step S21 in FIG. 23). If the result of detection is that this packet is the synchronization flag registration request packet, the contents of this packet are delivered to the portion of the microcontroller 621 that performs the function of the synchronization information administration apparatus 24 (step S22).

Figure 24:
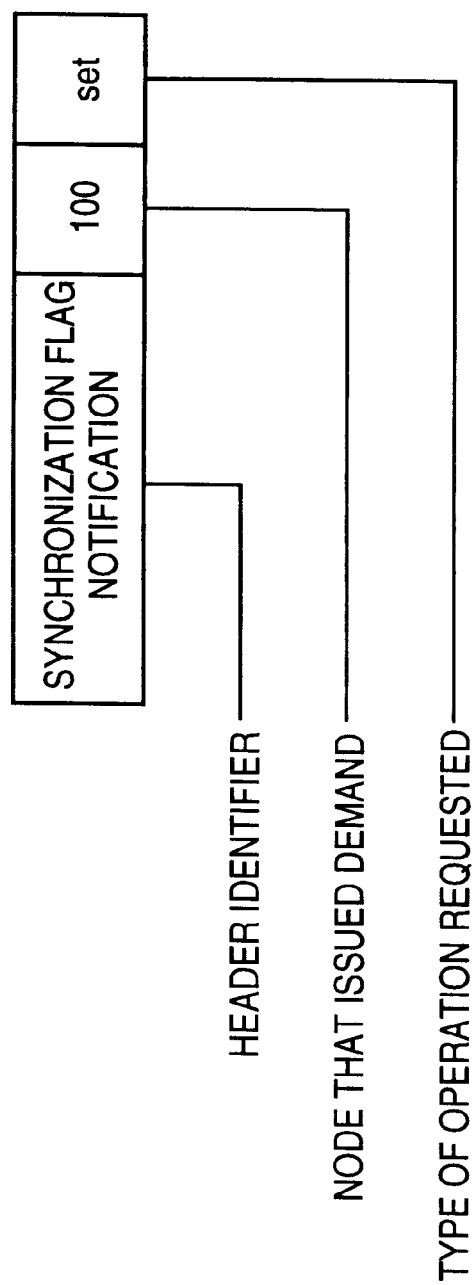
FIG. 24 is a diagram showing an example of the data structure of a synchronization flag detection notification packet according to the second embodiment.

On the basis of the information that has been brought to it, the synchronization information administration apparatus 24 registers the fact that the reserve flag as been turned on in the node 100 in its internal table in order to maintain the synchronization among the CPUs across the nodes (step S23). Thereafter, the synchronization information administration apparatus 24 notifies each node of the occurrence of a node that attempted to achieve synchronization across nodes. This is performed by creating the synchronization flag detection notification packet of the kind shown in FIG. 24 (step S24) and writing the packet in the parallel/serial converter 627.

It should be noted that each node that has received notification notifies the other nodes of the fact that the store operation will be carried out in the node via the bus arbiter before all of the store operations are carried out, this notification being given until notification of the fact that the flag has been turned OFF is detected.

The packet that has been written in the parallel/serial converter 627 is sent out on the optical signal path 35, which is for giving notification of synchronization information, via the light-emitting device 628 using light of wavelength λc, and the packet enters the star coupler 50 in the concentrator 30 (step S25). It is assumed that wavelength λc is different from the wavelengths λ2, λ3, which are used in data transmission, in order to prevent interference. The synchronization flag detection notification packet that has entered the star coupler 50 is divided among the nodes equally and is outputted to each node through the optical fibers 31, 32, 33, 34.

Figure 25:
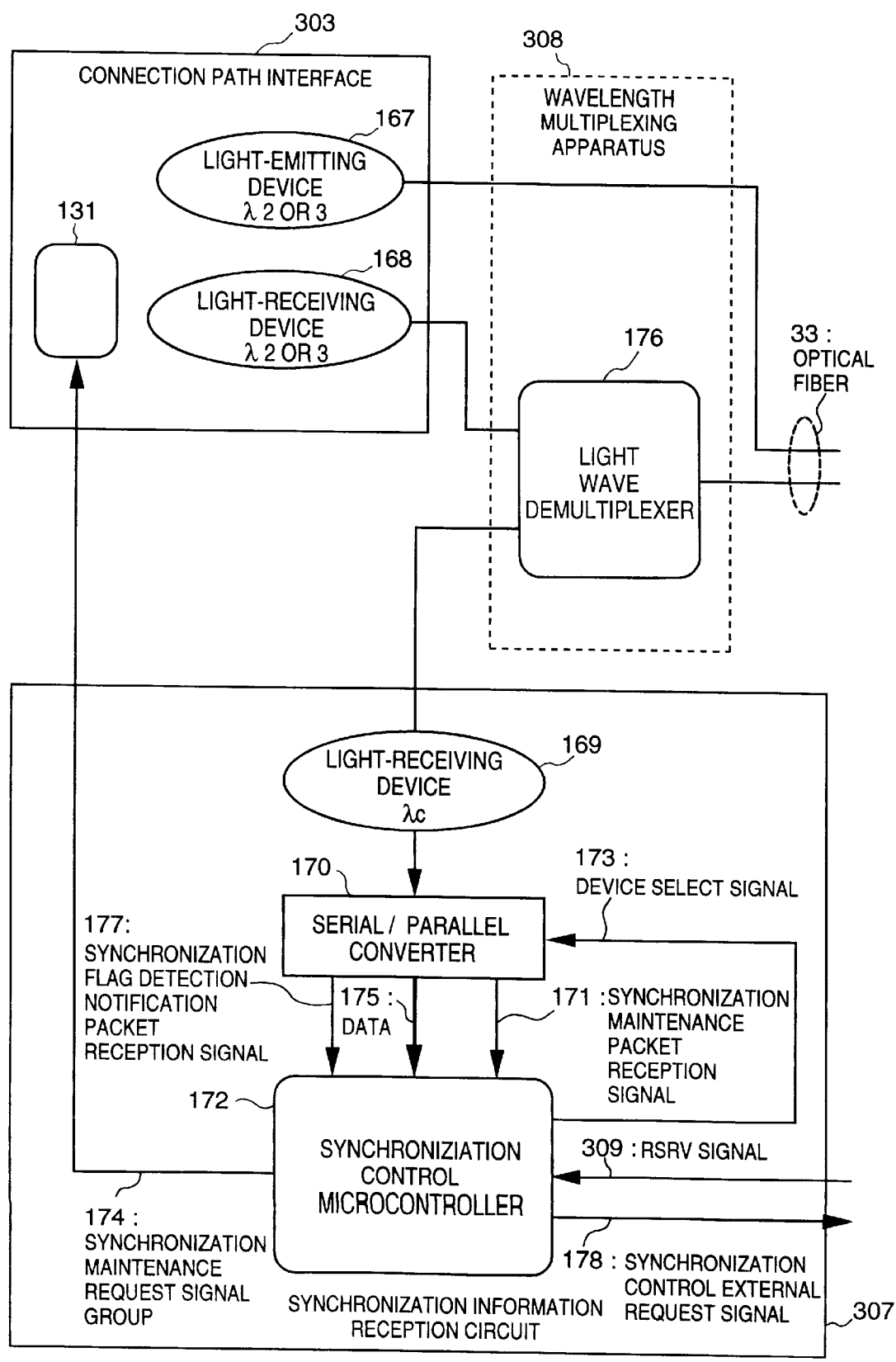
FIG. 25 is a block diagram illustrating a synchronization information receiving circuit 307 and a wavelength multiplexing apparatus 308 according to the second embodiment.
Figure 26:
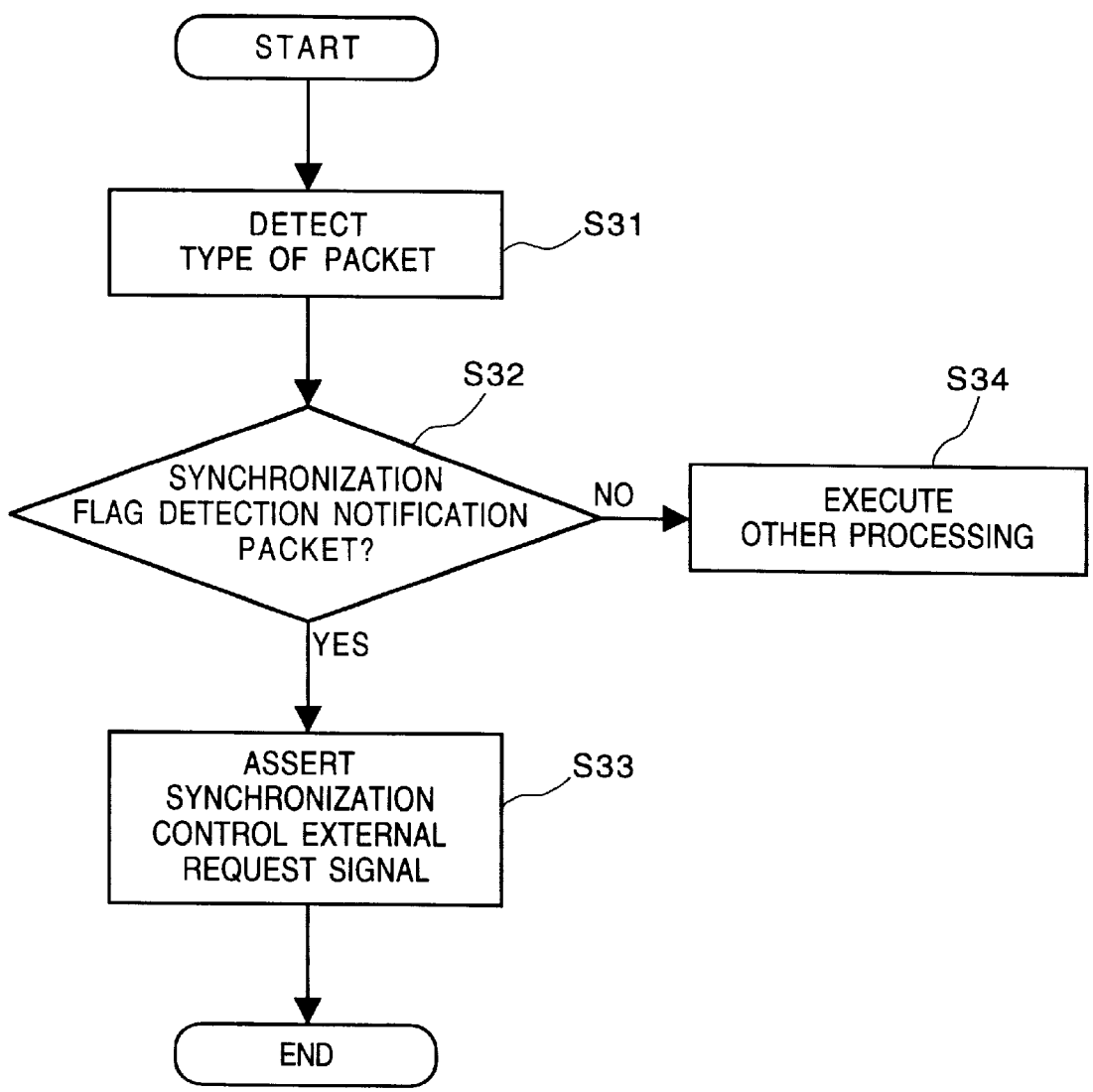
FIG. 26 is a flowchart showing the operation of the synchronization information receiving circuit of a node that has received the synchronization flag detection notification packet according to the second embodiment.

Next, detection of the synchronization flag detection notification packet in each node and the operation at each node corresponding to this detection will be described with reference to FIGS. 25 and 26 taking the operation of node 300 as an example. FIG. 25 is a block diagram illustrating the architecture of the synchronization information receiving circuit 307 and wavelength multiplexing apparatus 308, and FIG. 26 is a flowchart for describing operation of the synchronization information receiving circuit of the node that has received the synchronization flag invalidation packet according to the second embodiment.

As shown in FIG. 25, the light signal that has entered from the optical fiber 33 is separated by the light wave demultiplexer 176 into light (λ2 or λ3) directed toward the connection path interface 303 and light (λc) directed toward the synchronization information receiving circuit 307. The light of wavelength λc that has entered the synchronization information receiving circuit 307 is converted to an electric signal by a light-receiving device 169, and the electric signal is converted to a parallel signal by the serial/parallel converter 170. The parallel signal obtained is communicated to the synchronization control microcontroller 172 by the synchronization flag detection notification packet reception signal 177.

At this time the synchronization control microcontroller 172 reads out the contents of this packet by utilizing the device select signal 173 and detects the type of packet (step S31). If this packet is the synchronization flag detection notification packet, the synchronization control microcontroller 172 sets the internal register corresponding to the request issuing node and asserts a synchronization control external request signal line 178, which is a signal line for reflecting this status externally (steps S32, S33). The arbiter interface 304 which has received assertion of the synchronization control external request signal line 178 operates, from this point onward, in order to reflect the store operation detected on the bus in the external node while the signal line 178 is being asserted.

If it is found at step S32 that the packet is not the synchronization notification packet, then the program proceeds to step S34 and other processing is executed.

The process through which the data at address 41000000h of the RAM in node 200 are loaded in the processor 101 inside node 100 is implemented by reading the data between nodes as set forth in the specification of Japanese Patent Application Laid-Open No. 7-143136.

Operation in a case where the SC instruction has been issued will be described next. Here it is assumed that the CPU 201 of node 200 and the CPU 301 of node 300 have already loaded the data (four bytes) at address 41000000h of RAM 202 in node 200 by utilizing the LR instruction, and that the reserve flags of these nodes have become valid. As in the case of the node 100, it is assumed that the synchronization flag registration request packet (FIG. 3) has been sent to the synchronization information administration apparatus 24 inside the arbiter 20, and that the fact that the reserve flag has been turned on in the node 300 as well has been registered in the internal table. Furthermore, it is assumed that the states of the reserve flags are transmitted to each node and that the synchronization control external request signal line 178 has been asserted at each node.

With regard to the LC instruction issued by CPU 201 within node 200, it is judged that this is the address of own node and, hence, the synchronization flag registration packet is not generated.

Figure 27:
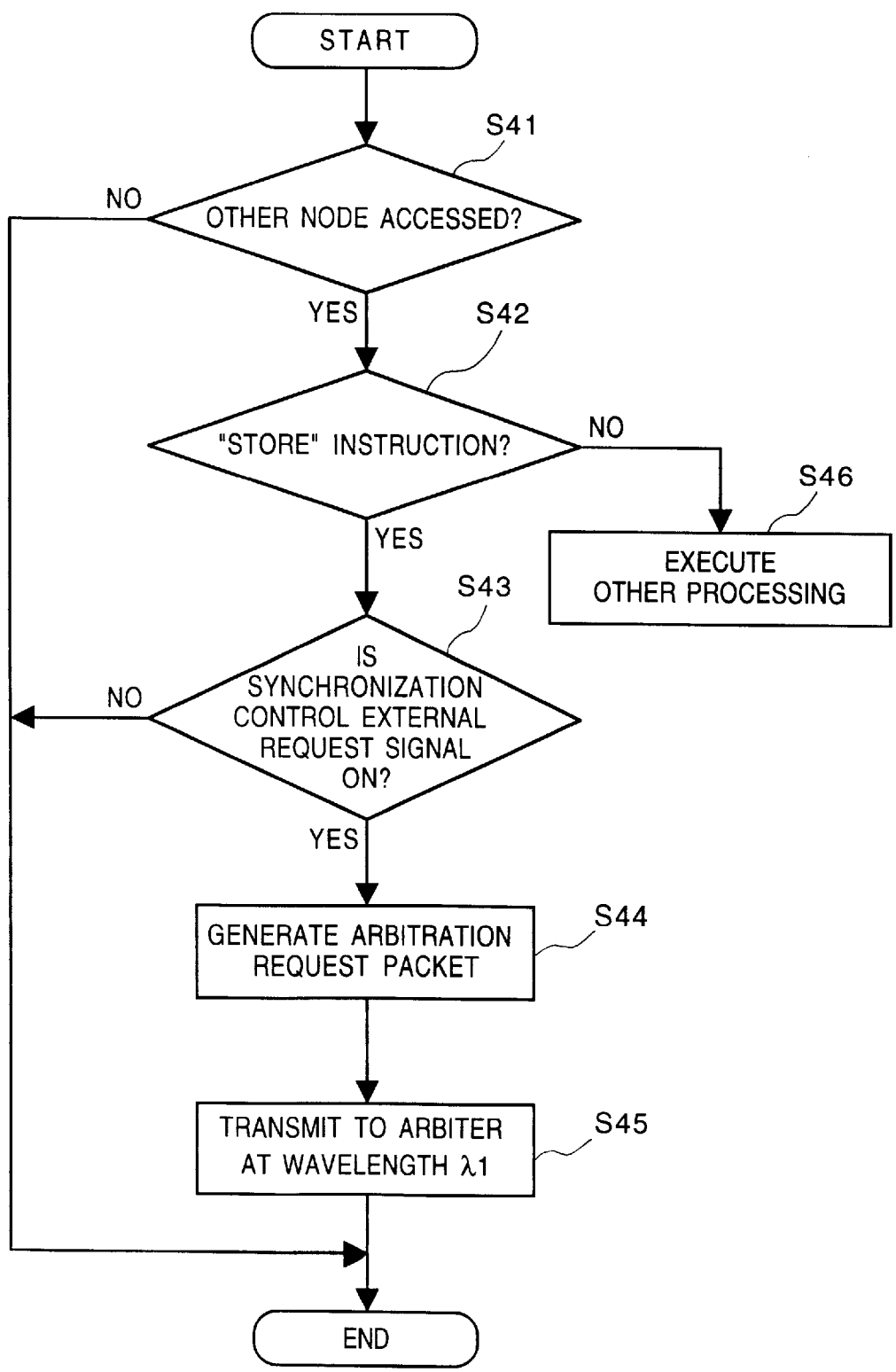
FIG. 27 is a flowchart for describing the operation of an arbiter interface that has detected issuance of an SC instruction according to the second embodiment.

The operation of the system for a case where the CPU 101 inside the node 100 issues the SC instruction and invalidates the reserve flags of the nodes 200 and 300 under these circumstances will be described. FIG. 27 is a flowchart showing the operation of the arbiter interface that has detected issuance of the SC instruction according to the second embodiment.

In FIG. 21, the address decoder 140 present inside the arbiter interface 104 constantly monitors the internal bus 105 of the node 101. (The internal bus 105 is constituted by data signal line 151, control signal line 152 and address signal line 153.) In a case where it is recognized that accessing to an external node (the node 200 in this instance) has occurred on the bus (where accessing means writing data to address 41000000h), control is handed over, by the external access detection signal 144 and write request detection signal 150, to the program run by the node arbitration control processor 141.

At the same time, the address being issued on the address signal line 153 at this time is latched in the address latch 142, and address information such as a read/write request type (write in this case) and number of transferred bytes (four bytes in this case) is latched in the control signal latch register 143.

At the same time, the control signal decoder 180 present in the synchronization request detection apparatus 106 incorporated in the arbiter interface constantly monitors the control signal line 152. In a case where it is recognized that the store instruction (the SC instruction to address 41000000h in node 200 in this instance) has been generated on the bus, the control signal decoder 180 notifies the program, which is run by the node arbitration control processor 141, of the possibility that synchronized control is required. This notification is given by a store demand detection signal 181. In this case, the synchronized control is performed since the synchronization control external request signal line 178 is being asserted.

More specifically, at step S41 in FIG. 27, it is detected whether accessing to another node has occurred on the bus. If the answer is "YES", then the program proceeds to step S42. Here it is determined, based upon the write request detection signal 150 and store request detection signal 181, whether the store instruction has been issued. If the answer is "YES", then the program proceeds to step S43. Furthermore, if the synchronization control external request signal is ON, the program proceeds to step S44, where synchronized control is executed. If the store instruction has not been issued ("NO" at step S42), then the program proceeds to step S46, where other processing is executed.

Upon receiving notification of the external access detection signal 144, write request detection signal 150, synchronization control external request signal and store request detection signal 181, the node arbitration control processor 141 reads out the signals latched by the address latch 142 and control signal latch 143, discriminates the destination of the connection and creates the arbitration request packet of the kind shown in FIG. 9 (step S44).

The arbitration request packet that has been created is written in the parallel/serial converter 161. The latter converts the written information to serial data and outputs the serial data to the light-emitting device 163. The latter photoelectrically converts the entered signal and outputs a light signal of wavelength $\lambda1$ to the arbiter 20 through the communication line 110 constituted by the optical fiber (step S45).

The operation of the arbiter 20 that has received this arbitration request packet, which operation has been described with reference to FIGS. 6 and 10 of the first embodiment, is substantially the same in the second embodiment. Only aspects of the operation that differ will be described here.

In the second embodiment, the existence of a node whose reserve flag is ON is recognized at step S57 since notification has already been received from nodes 100, 300 by way of the synchronization flag registration request packets.

Further, if, as a result of checking the internal table, it is found that the reserve flags are invalid in all of the nodes or that they are valid only in nodes issuing a connection request, the series of operations for designating flag invalidation is not performed.

The processing for the reserve flag invalidation operation for maintaining synchronization between CPUs at nodes 200 and 300, which operation was described with reference to FIGS. 13, 14 and 15 of the first embodiment taking the operation of node 300 as an example, is the same in the second embodiment.

Figure 28:
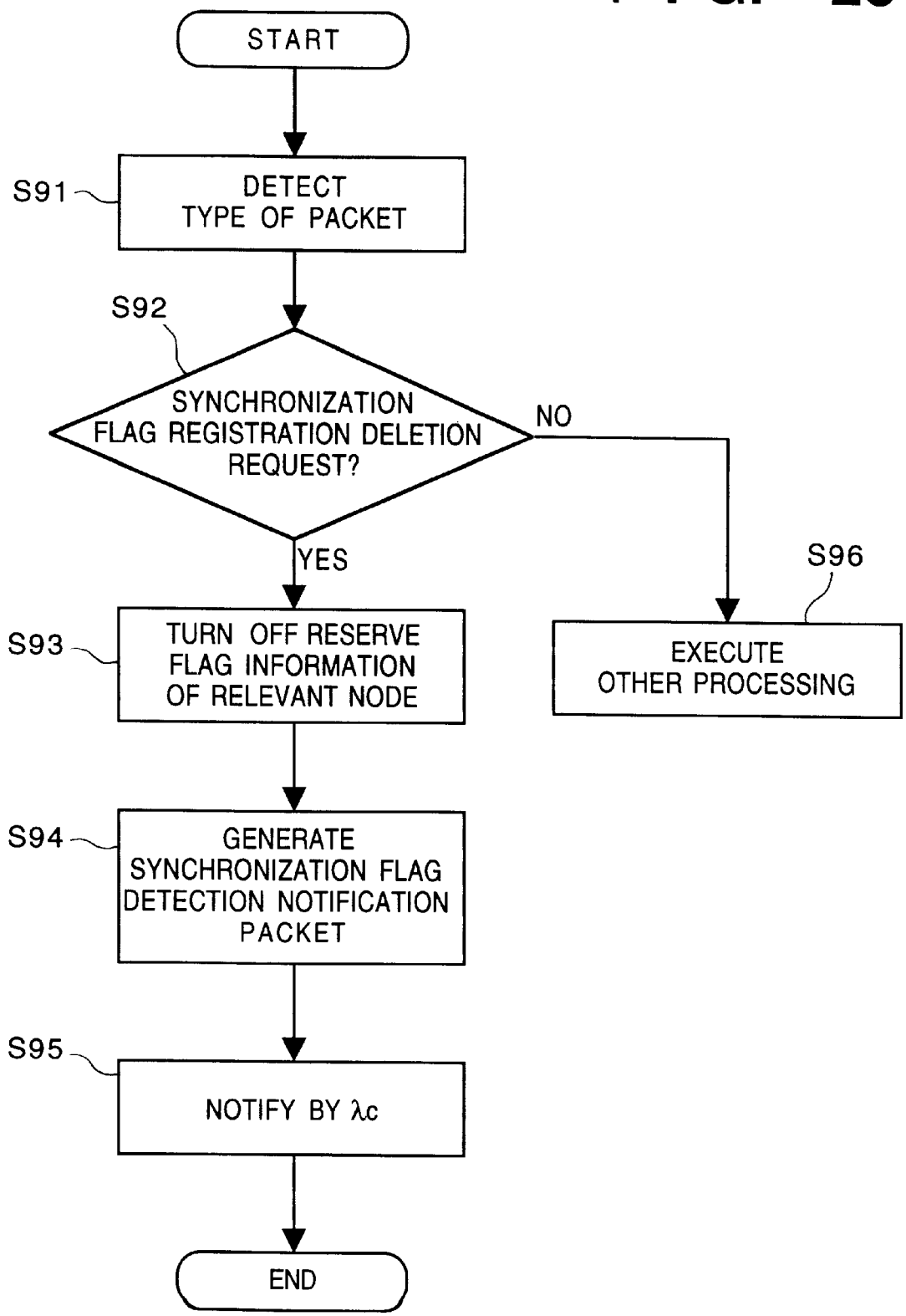
FIG. 28 is a flowchart for describing the operation of an arbiter that has received the synchronization flag registration deletion request packet according to the second embodiment.

The operation of the arbiter that has received the synchronization flag registration deletion request packet according to the second embodiment will be described with reference to FIG. 28.

Figure 29:
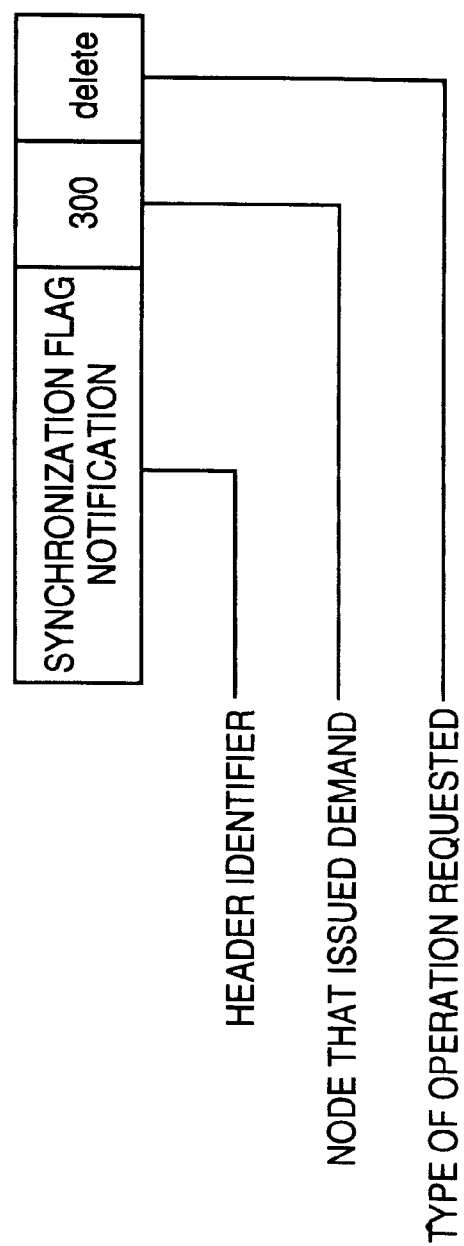
FIG. 29 is a diagram showing an example of the data structure of a synchronization flag deletion notification packet according to the second embodiment.

First, the packet information administration apparatus 21 detects the type of packet received and advances processing to step S93 if the packet is the synchronization flag registration deletion request packet (steps S91, S92). Upon receiving the synchronization flag registration deletion request packet, the arbiter 20 delivers the packet to the synchronization information administration apparatus 24. On the basis of the information received, the synchronization information administration apparatus 24 deletes information indicating that the reserve flag of the node 300 is valid from the information that has been registered in the internal table (step S93). At the same time, the synchronization flag deletion notification packet of the kind shown in FIG. 29 is sent to each node (steps S94, S95).

Figure 30:
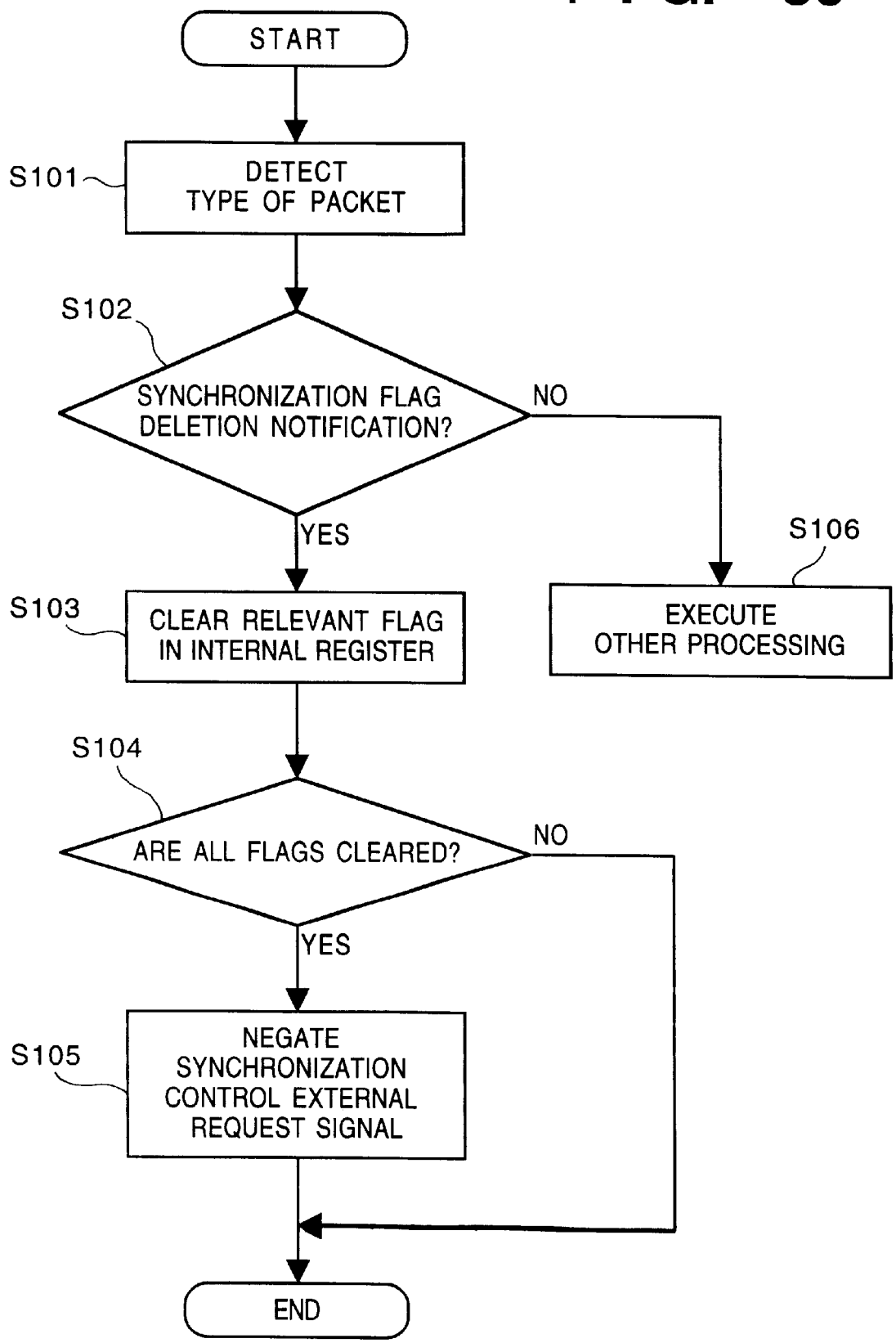
FIG. 30 is a flowchart for describing the operation of a node that has received the synchronization flag deletion notification packet according to the second embodiment.

The operation of a node that has received the synchronization flag deletion notification packet of the second embodiment will be described with reference to FIG. 30. Upon detecting synchronization flag deletion notification, the node clears the corresponding internal register of the synchronization control microcontroller 172 (steps S101~S103). In a case where all flags in the internal registers have been cleared (i.e., in a case where none of the other nodes require synchronization processing), the synchronization control external request signal line 178 is negated (steps S104, S105).

Figure 31:
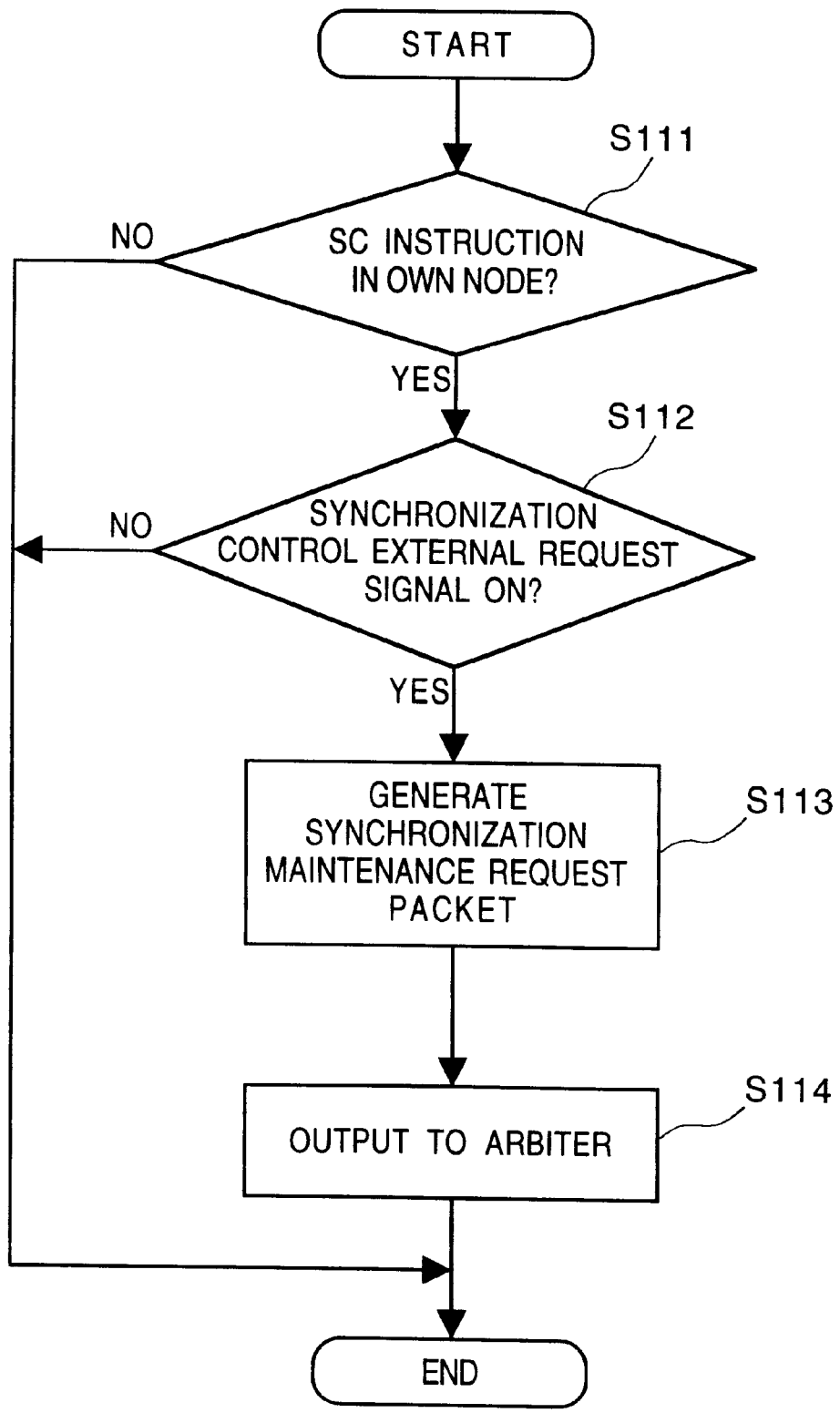
FIG. 31 is a flowchart useful in describing an operation for maintaining synchronization in a case where an SC instruction has been issued within a node itself according to the second embodiment.

A concrete example of operation will be described below in case of a synchronization instruction to data in the memory within a node per se, i.e., a case where the CPU in the node 100 loads data (four bytes) of data at address 01000000h of the RAM within this node, which data are utilizable in a synchronization instruction, by utilizing the LR instruction, and an attempt is made to change this by issuing the SC instruction. Specifically, how the operation of the second embodiment for maintaining synchronization accompanying this is executed will be described with reference to FIG. 31. FIG. 31 is a flowchart useful in describing an operation for maintaining synchronization in a case where the SC instruction has been issued within a node itself.

In FIG. 21, control is handed over to the program, which is run by the node arbitration control processor 141, by the write request signal 150 and store request signal 181 without the external access detection signal 144 reacting. At the same time, the address being issued on the address signal line 153 at this time is latched in the address latch register 142 and control information such as the number of transfer bytes (four) is latched in the control signal latch register 143.

The node arbitration control processor 141 advances processing from step S111 to step S112 when the SC instruction is issued. The status of the synchronization control external request signal line 178 is checked at step S112. If the synchronization control external request signal line 178 has been negated, it is unnecessary to take any exterior action and, hence, from this point onward is canceled. On the other hand, if the synchronization control external request signal line 178 has been asserted, maintenance of synchronization outside the node is necessary. Accordingly, the operation set forth below is executed.

Figure 19:
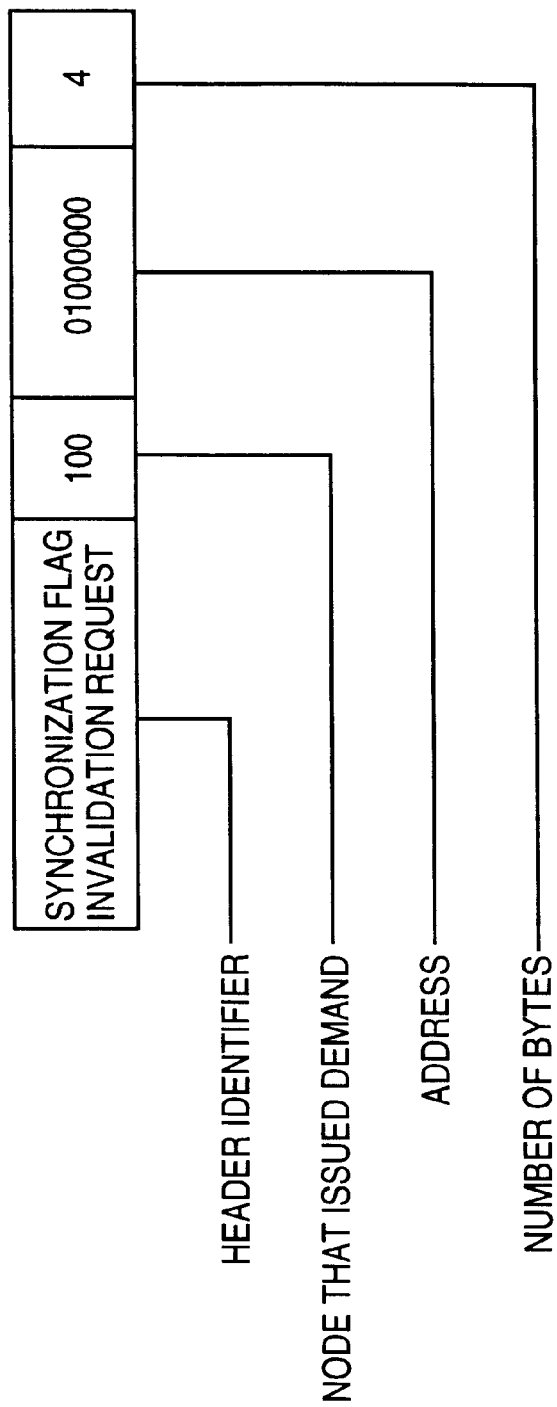
FIG. 19 is a diagram for describing an example of the data structure of a synchronization maintenance request packet according to the first embodiment.

First, at step S113, the node arbitration control processor 141 reads out the signals latched by the address latch 142 and control signal latch 143, creates a synchronization maintenance request packet of the kind shown in FIG. 19 and writes this packet in the parallel/serial converter 161. The latter converts the written synchronization maintenance request packet to serial data and outputs the serial data to the light-emitting device 163. The later photoelectrically converts the input signal and outputs the result, as a light signal of wavelength λ1, to the arbiter 20 through the communication line 110 constituted by an optical fiber (step 114).

Thus, in accordance with the second embodiment as described above, whether or not a synchronization maintenance operation is required between nodes can be judged at each node. As a result, it is possible to request the arbiter for the synchronization maintenance operation only when this operation is necessary between nodes. The load in terms of maintaining synchronization between nodes is reduced in comparison with the first embodiment and the processing capability of the overall system is improved.

[Third Embodiment]

In the first and second embodiments described above, information relating to synchronization is broadcast using the optical signal path 35 for giving notification of synchronization information as well as the special-purpose wavelength λc when this information is re-distributed from the arbiter to each of the nodes. However, if the information based upon the RSRV signal line is utilized effectively, the same results can be obtained with out providing these devices. A method of achieving this will be described below. It should be noted that components identical with those of the first and second embodiments will be designated by like reference symbols in the third embodiment.

Figure 32:
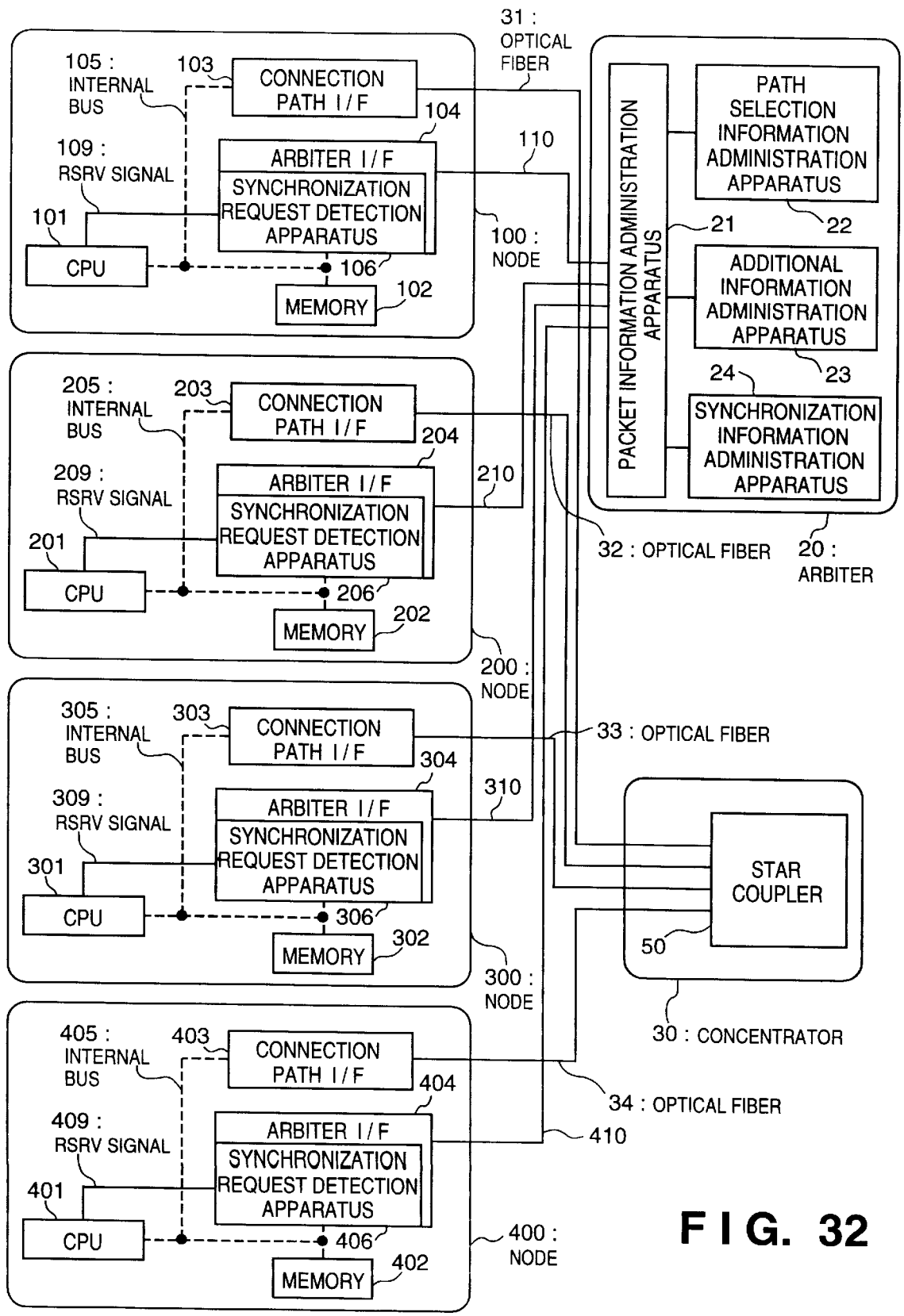
FIG. 32 is a block diagram illustrating the architecture of a system according to a third embodiment of the present invention.

FIG. 32 is a block diagram illustrating the architecture of a system according to a third embodiment of the present invention. This arrangement differs from that of FIG. 1 in that the wavelength multiplexing apparatus and synchronization information receiving circuit in each node are not required, and that the synchronization information notification optical signal path 35 for broadcasting information from the synchronization information administration apparatus 24 in the arbiter 20 is absent.

The difference between the third embodiment and the first and second embodiments essentially resides in the manner in which the synchronization information is distributed from the arbiter 20 to each of the nodes. This will be described with reference to FIG. 33.

Specifically, in a case where the CPUs 101, 201 and 301 of nodes 100, 200 and 300, respectively, attempt to achieve synchronization with regard to data (four bytes) at address 41000000h of memory 202 in node 200, the following description indicates the manner in which the synchronization information is distributed by the arbiter 20 in the operation for maintaining synchronization among the CPUs. It should be noted that the various operations that take place before the distribution of the synchronization information (namely the implementation of the LR instruction in each node, the detection of the change in status of the RSRV signal, the notification of the arbiter, the registration in the table, the notification of each node, the detection of the SC instruction and the notification of the arbiter) are the same as in the first and second embodiments and need not be described again.

Figure 33:
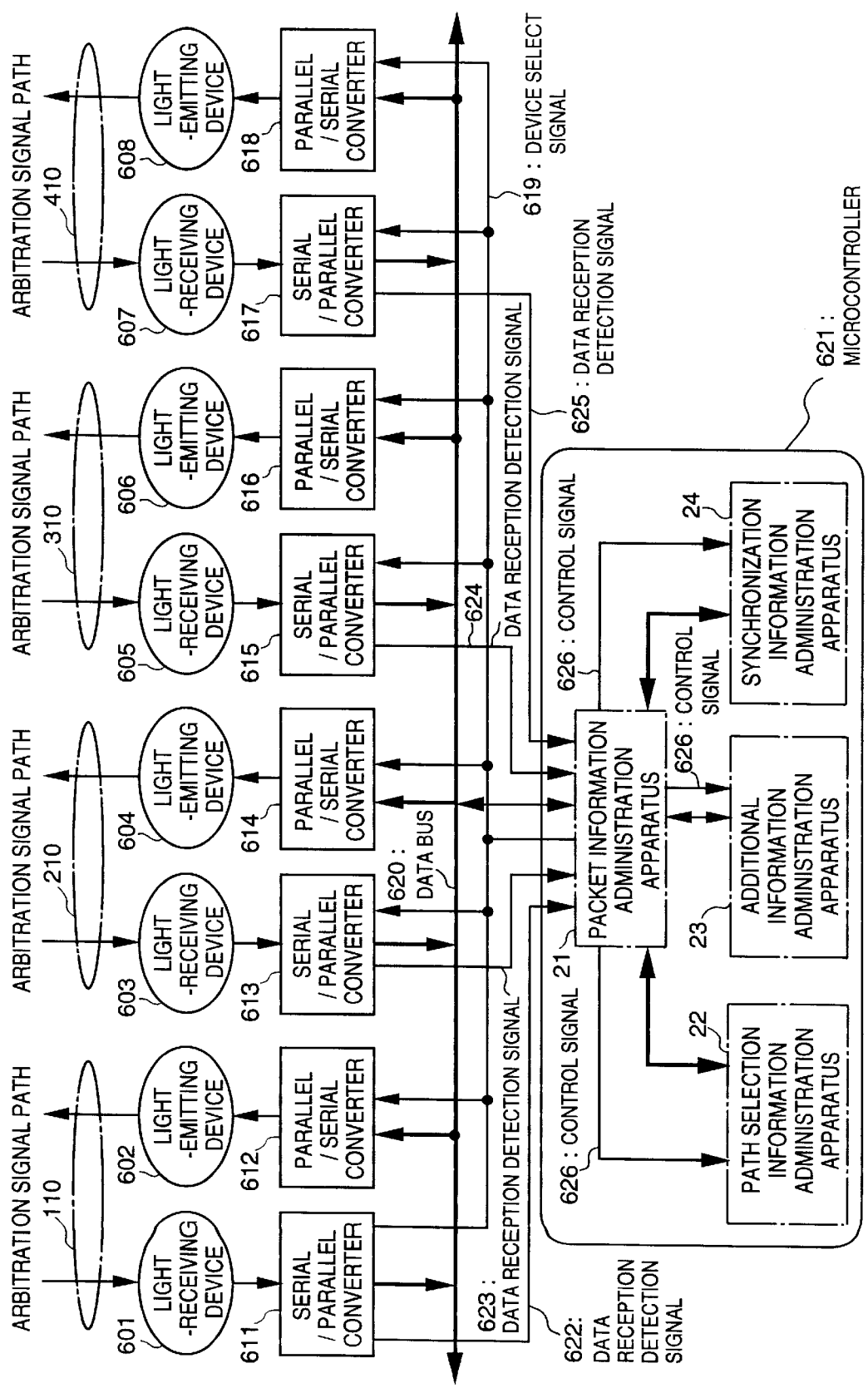
FIG. 33 is a block diagrams showing the architecture of an arbiter according to the third embodiment.
Figure 34:
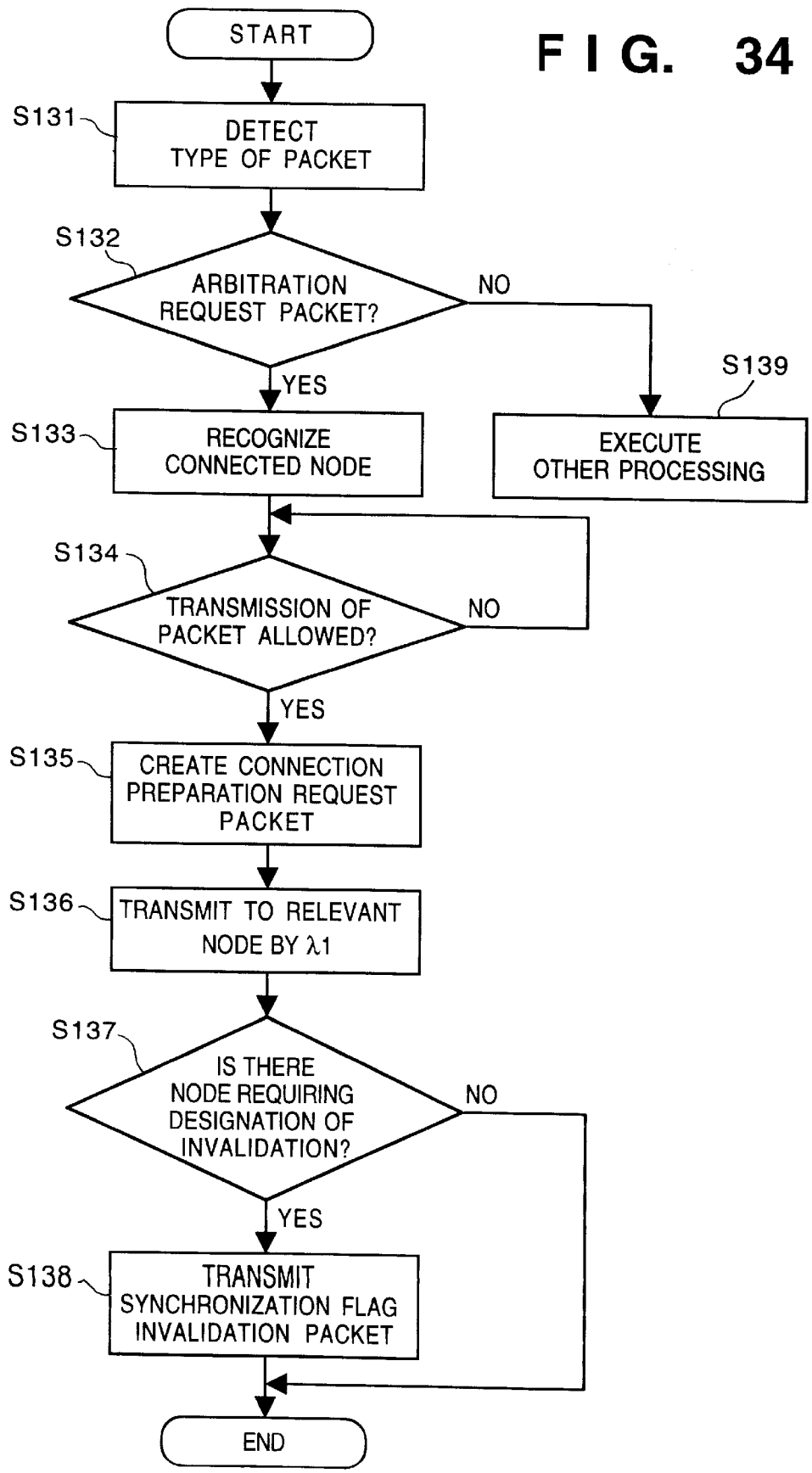
FIG. 34 is a flowchart for describing processing executed at reception of an arbitration request packet by an arbiter according to the third embodiment.

FIG. 33 is a block diagrams showing the architecture of the arbiter according to the third embodiment, and FIG. 34 is a flowchart for describing processing executed at reception of the arbitration request packet by the arbiter according to the third embodiment.

Assume that the arbitration request packet attendant upon detection of the SC instruction has arrived from the node 100 and has been fed into the serial/parallel converter 611. The latter converts the entered serial electric signal to a parallel signal and notifies the packet information administration apparatus 21 by the data reception detection signal 622. Upon receiving the data reception detection signal 622, the packet information administration apparatus 21 selects the serial/parallel converter 611 by the device select signal 619 reads out the arbitration request packet, which has been sent from the node 100 through the data bus 620, from the internal register.

Of the information contained in the arbitration request packet, the information of the requesting node number is delivered to the path selection information administration apparatus 22. The portion of the additional information concerning data transfer is stored in the portion of the microcontroller that performs the function of the additional information administration apparatus 23. Furthermore, when it is judged that this packet is one that accompanies the operation for maintaining synchronization among CPUs, the operation for maintaining synchronization among the CPUs at each node is required. Consequently, the address in the arbitration request packet and such information as the requesting node number are stored in the portion of the microcontroller that performs the function of the synchronization information administration apparatus 24.

When it is determined by the packet information administration apparatus 21 that the received packet in the arbitration request packet (steps S131 and S132 in FIG. 34), the following processing is executed: The path selection information administration apparatus 22 analyzes the received data and recognizes the fact that this transmission line use request is a connection request from the node 100 to the node 200 (step S133). The path selection information administration apparatus 22 checks an internally provided flag indicating the state of use of the transmission line, as well as the wavelength being used. If the transmission line is in a usable state, the path selection information administration apparatus 22 sets the flag to the in-use state. The path selection information administration apparatus 22 creates the connection preparation request packet shown in FIG. 11 and writes this packet in the serial/parallel converters 612 and 614 corresponding to nodes 100 and 200, respectively (steps S134, S135).

The connection preparation request packets contain the information obtained from the portion of the microcontroller that performs the function of the additional information administration apparatus 23, as well as the wavelength information. These two connection preparation request packets are outputted to the nodes 100 and 200 using light signals of wavelength λ1, similar to the case of the optical arbiter interface (step S136).

Next, in order to maintain synchronization among the CPUs at each of the nodes, the synchronization information administration apparatus 24 determines, on the basis of the information that has been brought to it, whether the reserve flag is currently on in any node.

Since notification has already been received through the synchronization flag registration request packets from the nodes 100, 200 and 300 in this case (nodes 100 and 300 in the case of the second embodiment), it is recognized that three nodes (two in the second embodiment) whose reserve flags are ON exist.

Next, the synchronization information administration apparatus 24 discriminates whether there is a node that must execute synchronization flag invalidation processing by a designation from the arbiter. In this case, the nodes 100 and 200 execute maintenance of the synchronization flag by an actual data transfer. However, at node 300, which does not directly take part in data transfer, designation of synchronization flag invalidation is required from the arbiter.

Thus, the existence of a packet (node 300 in this example) requiring designation of invalidation is detected (step S137). In a case where the reserve flag has been set in correspondence with the address 41000000h, the synchronization information administration apparatus 24 creates the synchronization flag invalidation packet of the kind shown in FIG. 12 in order to instruct the node 300 to invalidate this flag. Next, the packet information administration apparatus 21 is instructed to write the synchronization flag invalidation packet in the parallel/serial converter 616 in order to send the packet via the arbitration path 310 connected to the node 300. The packet that has been written is sent out on the arbitration signal path 310 through the light-emitting device 606 using the wavelength λ1 (step S138).

In a case where the result of checking the internal table indicates that the reserve flags are not valid in all of the nodes, and in a case where a node is the direct object of a data transfer, even though its reserve flag is valid, the series of operations for designating flag invalidation is not carried out.

In the third embodiment, one node is the object of transmission of the synchronization flag invalidation packet. In a case where there are a plurality of such nodes, packets are successively written in each of the parallel/serial converters and sent to each of the nodes in a similar manner.

Figure 35:
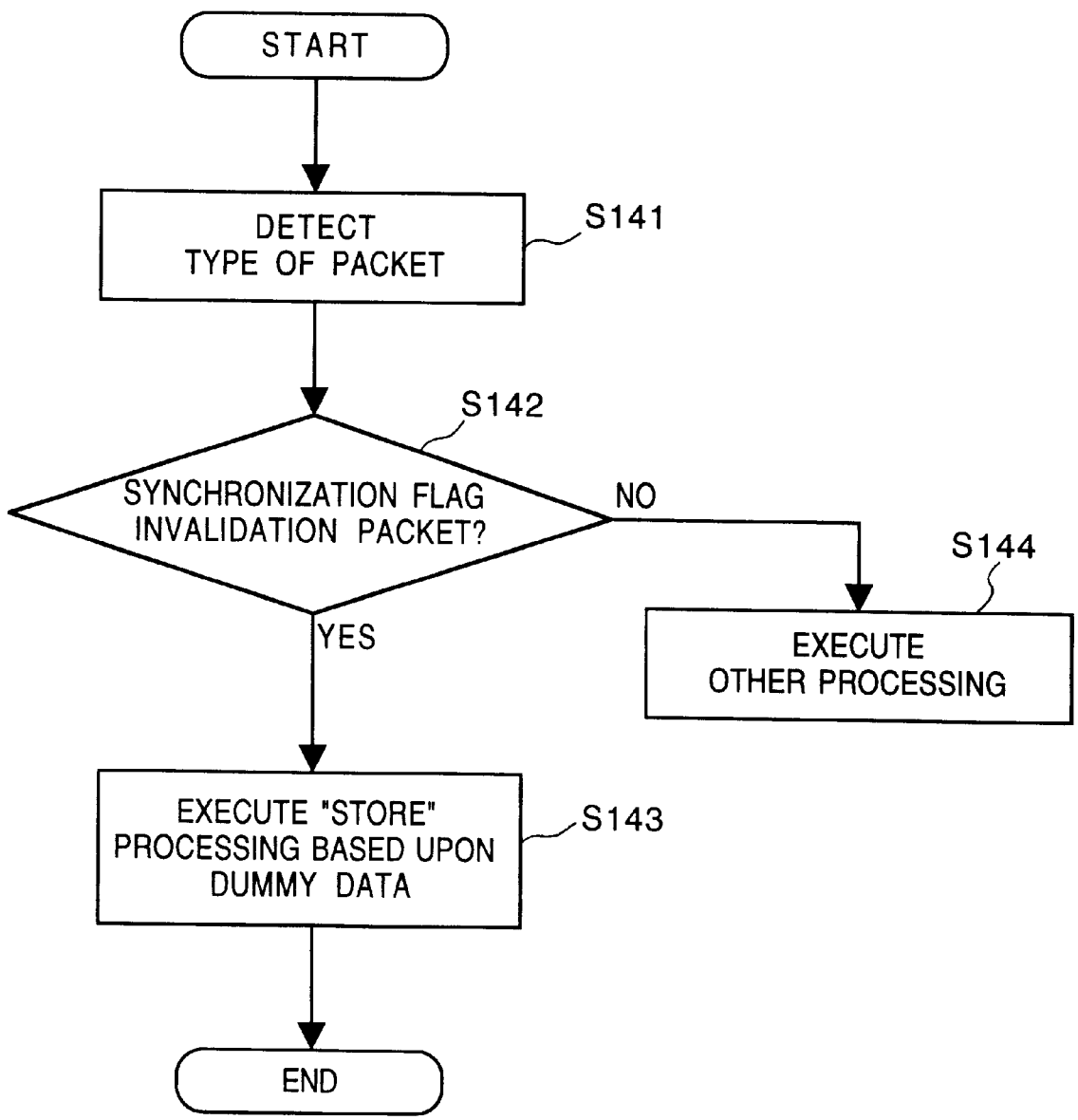
FIG. 35 is a flowchart for describing processing at reception of a synchronization flag invalidation packet according to the third embodiment.

The operation of node 300 that has received this packet will be described with reference to FIGS. 4 and 35. FIG. 35 is a flowchart for describing processing at reception of a synchronization flag invalidation packet according to the third embodiment.

At node 300, a light signal that has entered from the optical fiber 310 (110 in FIG. 4) is photoelectrically converted by the light-receiving device 164 to an electric signal and the electric signal enters the arbiter interface 304 (104 in FIG. 4). The signal applied to the arbiter interface 304 is converted to a parallel signal by the serial/parallel converter 162. At the same time, the node arbitration control processor 141 is notified of receipt of the packet by the data reception signal 148.

When notification is detected, the node arbitration control processor 141 of node 300 uses the device select signal 147 and data bus 145 to read the above-mentioned synchronization flag invalidation packet out of the serial/parallel converter 162. If the packet received is the synchronization flag invalidation packet, permission to use the internal bus 305 is requested internally of the node (steps S141~S143). When permission to use the internal bus 305 is given, bus access (e.g., store processing) based upon dummy data is designated using a data transmission/reception request signal group 149.

More specifically, the node arbitration control processor 141 contacts the connection path interface 303 and instructs a CPU, which has set the reserve flag with relation to the designated address (address 41000000h), to issue a bus access for invalidating this flag on internal bus 305 on the basis of the contents of the synchronization flag invalidation packet. The dummy data store processing can be executed in the same manner as in the first embodiment (steps S75~S80 in FIG. 15) and need not be described again.

If the arrangement described above is adopted, multicasting of synchronization-related information can be executed only with regard to the necessary node.

The present invention can be applied to a system constituted by a plurality of devices (e.g., a host computer, interface, reader and printer) or to an apparatus comprising a single device (e.g., a copier or facsimile machine, etc.).

Further, it goes without saying that the object of the present invention can also be achieved by providing a storage medium storing the program codes of the software for performing the aforesaid functions of the embodiment to a system or an apparatus, reading the program codes with a computer (e.g., a CPU or MPU) of the system or apparatus from the storage medium, then executing the program.

In this case, the program codes read from the storage medium realize the functions of the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written in a function extension card inserted into the computer or in a memory provided in a function extension unit connected to the computer, a CPU or the like contained in the function extension card or function extension unit performs a part of or the entire process in accordance with the designation of program codes and implements the function of the above embodiments.

The present invention is not limited to the above embodiments and various changes and modifications can be made within the spirit and scope of the present invention. Therefore, to apprise the public of the scope of the present invention, the following claims are made.

What is claimed is:

1. An information processing system having a plurality of nodes each including one or more CPUs that utilize monitoring of a common bus, wherein the plurality of nodes are connected to one another by a connection path that cannot monitor information on an internal bus in each node, the information processing system comprising:

arbitration means for arbitrating use of the connection path;

transmission paths for mutually connecting said arbitration means and the plurality of nodes to one another, said transmission paths being different from the connection path;

transmission means for transmitting information, which is required to perform synchronized operation in a node or among the nodes, to said arbitration means via the transmission paths;

distribution means for again distributing a portion of this information from said arbitration means to each node based upon the information transmitted by said transmission means; and reflecting means for reflecting, to each node, information distributed by said distribution means to each node, whereby synchronized operation of said CPUs over said nodes is realized, wherein a mechanism for establishing synchronized operation among the CPUs has a load reserve instruction for setting a reserve flag attendant upon execution of a loading instruction, and a store conditional instruction for checking the reserve flag prior to a execution of a storing instruction, executing the storing instruction if the reserve flag is valid and then invalidating the reserve flag, and wherein a store monitoring function with which the bus is monitored for making the reserve flag invalid if it is detected that another CPU has executed the storing instruction with at an address identical with an address at which the load reserve instruction has been executed, whereby synchronized operation among the CPUs is realized.

2. The system according to claim 1, wherein said arbitration means stores information indicating whether each node requires synchronization and controls distribution by said distribution means based upon the information stored.

3. The system according to claim 1, wherein said CPU externally outputs the status of the reserve flag by a signal line and is capable of externally recognizing that the status of a reserve flag by investigating said signal line, and the information transmitted by said transmission means contains an address that accompanies the storing instruction executed at each node, control information and information of the status of a reserve flag that could be recognized.

4. The system according to claim 3, wherein said distribution means controls the distribution of the information from said arbitration means to each node based upon information of the status of the reserve flag contained in the information transmitted by said transmission means.

5. The system according to claim 1, wherein said reflection means has means for generating a storing instruction inside its own node based upon information transmitted from an external node.

6. The system according to claim 1, wherein said connection path is an optical transmission line connected via a star coupler.

7. The system according to claim 1, wherein said connection path sends and receives light signals obtained by wavelength-multiplexing light signals of a plurality of wavelengths.

8. An information processing system having a plurality of nodes each including one or more CPUs that utilize monitoring of a common bus, wherein the plurality of nodes are connected to one another by a connection path that cannot monitor information on an internal bus in each node, the information processing system comprising:

arbitration means for arbitrating use of the connection path;

transmission paths for mutually connecting said arbitration means and the plurality of nodes to one another, said transmission paths being different from the connection path;

transmission means for transmitting information, which is required to perform synchronized operation in a node or among the nodes, to said arbitration means via the transmission paths;

distribution means for again distributing a portion of this information from said arbitration means to each node based upon the information transmitted by said transmission means;

reflecting means for reflecting, to each node, information distributed by said distribution means to each node; and control means which, from the information transmitted as information required to perform the synchronized operation, notifies each node in advance of information indicating whether each node is currently performing synchronized operation, and controls sending of information, which accompanies synchronized operation performed at each node, to said arbitration means;

whereby synchronized operation of said CPUs over said nodes is realized, and wherein a mechanism for establishing synchronized operation among the CUPs has a load reserve instruction for setting a reserve flag attendant upon execution of a loading instruction, and a store conditional instruction for checking the reserve flag prior to a execution of a storing instruction, executing the storing instruction if the reserve flag is valid and then invalidating the reserve flag, and wherein a store monitoring function with which the bus is monitored for making the reserve flag invalid if it is detected that another CPU has executed the storing instruction with at an address identical with an address at which the load reserve instruction has been executed, whereby synchronized operation among the CPU's is realized.

9. The system according to claim 8, wherein said CPU externally outputs the status of the reserve flag by a signal line and is capable of externally recognizing that the status of a reserve flag by investigating said signal line, and the information transmitted by said transmission means contains an address that accompanies the storing instruction executed at each node, control information and information of the status of a reserve flag that could be recognized.

10. The system according to claim 9, wherein said control means notifies each node beforehand of information, which indicates the status of the reserve flag in each node, contained in information transmitted as information necessary for executing the synchronized operation, and controls sending of information, which accompanies the storing instruction executed at each node, to said arbitration means.

11. An information processing method in an information processing system having a plurality of nodes each including one or more CPUs that utilize monitoring of a common bus, wherein the plurality of nodes are connected to one another by a connection path that cannot monitor information on an internal bus in each node, and the information processing system includes arbitration means for arbitrating use of the connection path, transmission paths for mutually connecting said arbitration means and the plurality of nodes to one another, said transmission paths being different from the connection path, transmission means for transmitting information, which is required to perform synchronized operation in a node or among nodes, to said arbitration means via the transmission paths, and distribution means for again distributing a portion of this information from said arbitration means to each node based upon the information transmitted by said transmission means, said method comprising the steps of:

using a load reserve instruction for setting a reserve flag attendant upon execution of a loading instruction, and a store conditional instruction for checking the reserve flag prior to execution of a storing instruction, executing the storing instruction if the reserve flag is valid and then invalidating the reserve flag; and making possible synchronized operation among said CPUs by having a function with which the bus is monitored for making the reserve flag invalid if it is detected that another CPU has executed the storing instruction at an address identical with an address at which the lead reserve instruction has been executed, wherein said CPU externally outputs the status of the reserve flag by a signal line and is capable of externally recognizing that the status of a reserve flag by investigating said signal line, and the information transmitted by said transmission means contains an address that accompanies the storing instruction executed at each node, control information and information of the status of a reserve flag that could be recognized.

12. The method according to claim 11, wherein the distribution of the information from said arbitration means to each node is controlled based upon information of the status of the reserve flag contained in the information transmitted by said transmission means.

13. The system according to claim 11, wherein the information distributed to each node is reflected to each node by generating a storing instruction inside the node per se based upon information transmitted from an external node.

14. The method according to claim 11, wherein said connection path is an optical transmission line connected via a star coupler and sends and receives light signals obtained by wavelength-multiplexing light signals of a plurality of wavelengths.

15. An information processing method in an information processing system having a plurality of nodes each including one or more CPUs that utilize monitoring of a common bus, wherein the plurality of nodes are connected to one another by a connection path that cannot monitor information on an internal bus in each node, and the information processing system includes arbitration means for arbitrating use of the connection path, transmission paths for mutually connecting said arbitration means and the plurality of nodes to one anther, said transmission paths being different from the connection path, transmission means for transmitting information, which is required to perform synchronized operation in a node or among nodes, to said arbitration means via the transmission paths, and distribution means for again distributing a portion of this information from said arbitration means to each node based upon said transmission means, said method comprising:

a notification step of notifying each node, in advance, of information indicating whether each node is currently performing synchronized operation, this information being contained in the information transmitted as information required to perform the synchronized operation;

a control step of controlling sending of information, which accompanies synchronized operation performed at each node, to said arbitration means;

using a load reserve instruction for setting a reserve flag attendant upon execution of a loading instruction, and a store conditional instruction for checking the reserve flag prior to execution of a storing instruction, executing the storing instruction if the reserve flag is valid and then invalidating the reserve flag; and making possible synchronized operation among said CPUs by having a function with which the bus is monitored for making the reserve flag invalid if it is detected that another CPU has executed the storing instruction at an address identical with an address at which the load reserve instruction has been executed.

16. The method according to claim 15, wherein said CPU externally outputs the status of the reserve flag by a signal line and is capable of externally recognizing that the status of a reserve flag by investigating said signal line, and the information transmitted by said transmission means contains an address that accompanies the storing instruction executed at each node, control information and information of the status of a reserve flag that could be recognized.

17. The method according to claim 16, wherein each node is notified beforehand of information, which indicates the status of the reserve flag in each node, contained in information transmitted as information necessary for executing the synchronized operation, and sending of information, which accompanies the storing instruction executed at each node, to said arbitration means is controlled.

* * * * *

UNITED STATES PATENT AND TRADEMARK OFFICE
CERTIFICATE OF CORRECTION

PATENT NO.  : 5,933,261
DATED       : August 3, 1999
INVENTOR(S) : TOSHIYUKI FUKUI ET AL.

It is certified that error appears in the above-identified patent and that said Letters Patent is hereby corrected as shown below:

COLUMN 3

Line 5, "operation," should read --operation.--.

COLUMN 5

Line 19, "diagrams" should read --diagram--.

COLUMN 8

Line 37, "as" should read --has--.

COLUMN 9

Line 3, "Operation" should read --The operation--.

COLUMN 14

Line 15, "bytes) of data" should read --bytes of data)--.

UNITED STATES PATENT AND TRADEMARK OFFICE
CERTIFICATE OF CORRECTION

PATENT NO. : 5,933,261

DATED : August 3, 1999

INVENTOR(S) : TOSHIYUKI FUKUI ET AL.

It is certified that error appears in the above-identified patent and that said Letters Patent is hereby corrected as shown below:

COLUMN 16

Line 23, "such" should read --such a--.

COLUMN 17

Line 44, "as" should read --has--.

COLUMN 21

Line 48, "with out" should read --without--.

COLUMN 22

Line 16, "diagrams" should read --diagram--; and
    Line 28, "619 should read --619,--.

COLUMN 25

Line 26, "a" should read --an--; and
    Line 33, "with" (first occurrence) should be deleted.

UNITED STATES PATENT AND TRADEMARK OFFICE
CERTIFICATE OF CORRECTION

PATENT NO.   : 5,933,261
DATED        : August 3, 1999
INVENTOR(S)  : TOSHIYUKI FUKUI ET AL.

It is certified that error appears in the above-identified patent and that said Letters Patent is hereby corrected as shown below:

COLUMN 26

Line 43, "with" (first occurrence) should be deleted.

COLUMN 28

Line 6, "anther" should read --another,--.

Signed and Sealed this

Twenty-sixth Day of September, 2000

Attest:

Attesting Officer

Q. TODD DICKINSON
Director of Patents and Trademarks